(12) United States Patent
Hohsaka et al.

(10) Patent No.: US 6,743,568 B2
(45) Date of Patent: Jun. 1, 2004

(54) CYANINE DYES

(75) Inventors: Ayako Hohsaka, Okayama (JP); Dai Matsuura, Okayama (JP); Toshio Kawata, Okayama (JP); Shigeo Yasui, Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 0 days.

(21) Appl. No.: 09/783,190

(22) Filed: Feb. 12, 2001

(65) Prior Publication Data

US 2001/0044074 A1 Nov. 22, 2001

(30) Foreign Application Priority Data

| Feb. 10, 2000 | (JP) | 2000-032947 |
| Feb. 18, 2000 | (JP) | 2000-041001 |
| Nov. 17, 2000 | (JP) | 2000-351905 |

(51) Int. Cl.[7] .................................. G11B 7/24
(52) U.S. Cl. ............. 430/270.19; 430/945; 430/270.21
(58) Field of Search ............... 430/270.18, 270.19, 430/270.21, 945; 369/288; 548/400, 427

(56) References Cited

U.S. PATENT DOCUMENTS

| 3,723,419 | A | * | 3/1973 | Mee et al. | 260/240.6 |
| 3,926,971 | A | * | 12/1975 | Borror et al. | 260/240.6 |
| 4,626,496 | A | * | 12/1986 | Sato | 430/270.21 |
| 4,713,314 | A | * | 12/1987 | Namba et al. | 430/945 |
| 4,994,343 | A | | 2/1991 | Inagaki et al. | |
| 4,999,281 | A | * | 3/1991 | Inagaki et al. | 430/945 |
| 5,389,419 | A | * | 2/1995 | Maeda et al. | 430/945 |
| 5,547,728 | A | * | 8/1996 | Cunningham et al. | 430/945 |
| 5,574,715 | A | * | 11/1996 | Namba et al. | 369/288 |
| 5,604,004 | A | * | 2/1997 | Suzuki et al. | 430/945 |
| 5,679,430 | A | * | 10/1997 | Shinkai et al. | 430/945 |
| 5,976,658 | A | * | 11/1999 | Tomizawa et al. | 430/270.18 |
| 6,071,672 | A | * | 6/2000 | Namba et al. | 430/270.18 |
| 6,080,868 | A | * | 6/2000 | Lee et al. | 548/100 |
| 6,168,843 | B1 | * | 1/2001 | Kambe et al. | 369/288 |
| 6,218,072 | B1 | * | 4/2001 | Otaguro et al. | 430/270.21 |

FOREIGN PATENT DOCUMENTS

| EP | 0342939 | | 11/1989 |
| EP | 0840307 | | 5/1998 |
| EP | 0905202 | | 3/1999 |
| EP | 1035540 | | 9/2000 |
| EP | 1174472 | | 1/2002 |
| GB | 355693 | * | 8/1931 |
| JP | 02-055189 | * | 2/1990 |
| JP | 03-051182 | * | 3/1991 |
| JP | 03281287 | | 12/1991 |
| JP | 03-281287 | * | 12/1991 |
| JP | 11-034499 | * | 2/1999 |
| JP | 11034499 | | 2/1999 |
| JP | 11221963 | | 8/1999 |

OTHER PUBLICATIONS

Hamer, F.M., "The Cyanine Dyes and Related Compounds" (1964) pp. 116–147.*

* cited by examiner

*Primary Examiner*—Martin Angebranndt
(74) *Attorney, Agent, or Firm*—Browdy and Neimark, P.L.L.C.

(57) ABSTRACT

Optical recording media using mixtures of benzoindolenic trimethine cyanine dyes, where the first benzoindolenic trimethine cyanine dye bears a heterocyclic azo dye metal complex as the counterion and the second benzoindolenic trimethine cyanine dye has a different type of counterion. This combination of these benzoindolenic trimethine cyanine dyes coated on a substrate results in high density media, where the dyes have a high solubility and heat resistance.

2 Claims, 2 Drawing Sheets

CYANINE DYES

BACKGROUND OF THE INVENTION

1. Field of the Invention

The present invention relates to novel organic dye compounds, and more particularly, to trimethine cyanine dyes which are useful in high-density optical recording media.

2. Description of the Prior Art

As coming into this multi-media age, the following optical recording media have been greatly focused:

(i) compact disc recordable or CD-R, a write-once memory using compact disc, and (ii) digital versatile disc recordable or DVD-R, a write-once memory using digital video disc.

Optical recording media can be roughly classified into inorganic optical recording media which have recording layers composed of inorganic substances such as tellurium, selenium, rhodium, carbon, or carbon sulfide; and organic optical recording media which have recording layers mainly composed of light absorbents containing organic dye compounds.

Among such optical recording media, organic optical recording media can be usually prepared by dissolving a cyanine dye in an organic solvent such as 2,2,3,3-tetrafluoro-1-propanol (abbreviated as "TFP" hereinafter), coating the solution on the surface of a polycarbonate substrate, drying the coated solution to form a recording layer, and sequentially forming and attaching on the surface of the recording layer (i) a reflection layer made of a metal such as gold, silver or copper, and (ii) a protection layer made of an ultraviolet ray hardening resin. When compared with inorganic optical recording media, organic ones may have the drawback that their recording layers may be easily changed by environmental lights such as reading- and natural-lights. Optical recording media, however, have the merit that they can be made into optical recording media at a lesser cost because their recording layers can be directly formed by coating light absorbents in a solution form on the surface of substrates. Further, organic optical recording media, which are composed of organic materials, are now mainly used as low-cost optical recording media because they are substantially free of corrosion even when contacted with moisture or sea water and because information, stored in optical recording media by a fixed format, can be read out by using commercialized readers by the establishment of thermal-deformation-type optical recording media as organic optical recording media.

What is urgently required in organic optical recording media is to increase their storage capacity to suit for this multi-media age. The research for such an increment, which is now being eagerly continued in this field, is to shorten the wavelength of a laser beam for writing information from 775–795 nm, that is irradiated by conventional GaAlAs semiconductor lasers, to a wavelength of 700 nm or shorter. However, since most of conventional cyanine dyes explored for CD-Rs could not appropriately write and read information by using a laser beam with a wavelength shorter than 700 nm when used in high-density optical recording media such as DVD-Rs, the cyanine dyes now used could not fulfil the need for high-storage density required in many fields.

As another causative for spoiling the high-storage density of organic optical recording media, there may exist problems of the thermal decomposition and the heat resistance of dyes. In organic optical recording media, pits are formed by using heat generated when dyes absorb a laser beam and then melt and decompose. However, most of conventional cyanine dyes have a rather lower decomposition point, and this results in the problem that the part around the pits and other pit-less part on the recording surface may be easily deformed by the accumulated heat which is generated when the dyes are exposed to a reading laser-beam for a relatively-long period of time because the cyanine dyes have a relatively-low heat resistance.

High quality products must be provided in large quantity and low price to make high density optical recording media such as a DVD-R fix, as an information recording means for multi-media age, in place of papers. For the purpose, it is necessary to efficiently coat light absorbents on a substrate and make optical recording media with a good recording characteristic and higher stability. Light absorbents which easily dissolve in organic solvents are essential, and more particularly, the development of light absorbents, which less pollute environment and easily dissolve in non-halogen solvents, has been desired. Although various light absorbents were provided and some of them have been actually used, no light absorbent, which can satisfy both the desired light characteristic and solubility, has been realized.

SUMMARY OF THE INVENTION

In view of the foregoing, the object of the present invention is to provide organic dye compounds which exert satisfactory solubility and heat resistance when used in high-density optical recording media.

To attain the above object, the present inventors eagerly studied and screened compounds. As a result, they found that specific trimethine cyanine dyes (may be called "cyanine dyes" hereinafter) which substantially absorb a visible light with a wavelength of shorter than 700 nm, are obtainable through a step of reacting benzoindolenium compounds bearing a reactive methyl group with benzoindolenium compounds bearing a suitable leaving group. They also found that, when compared with conventional related compounds, most of the cyanine dyes of the present invention have the following characteristics: They have significantly-high solubility in organic solvents which are frequently used in preparing optical recording media, and more particularly, non-halogenated solvents, have decomposition points over 272° C., and have relatively-high heat resistances. The present inventors confirmed that the trimethine cyanine dyes form minute pits stably on the recording surfaces and at a relatively-high density when irradiated with a laser beam at a wavelength of shorter than 700 nm in optical recording media. The present invention was made based on the creation of novel organic dye compounds and the discovery of their industrially useful characteristics.

BRIEF EXPLANATION OF THE ACCOMPANYING DRAWINGS

DETAILED DESCRIPTION OF THE INVENTION

Figure 1:
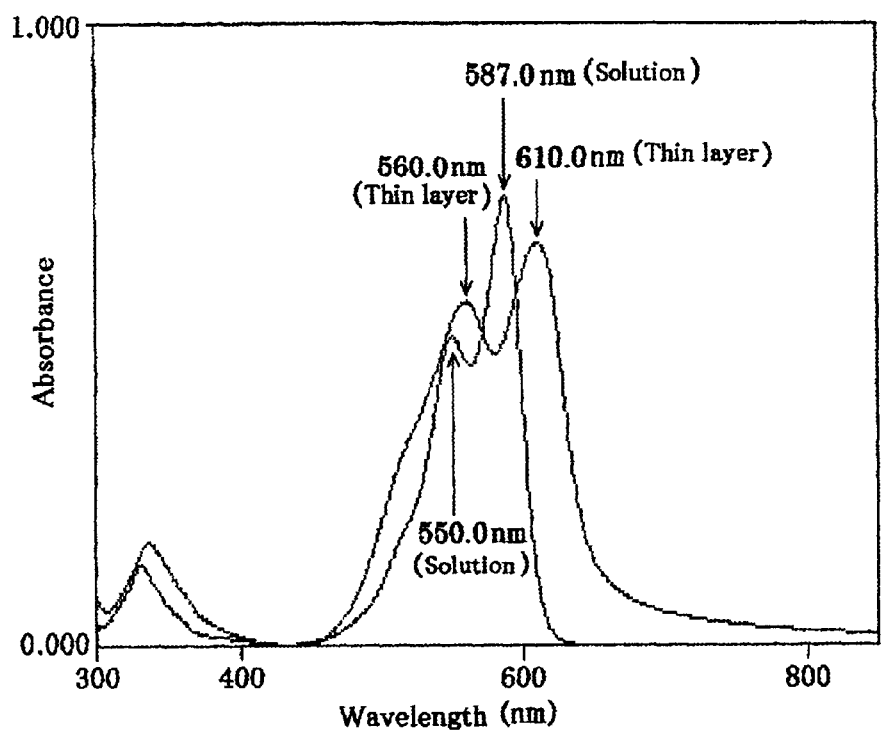
FIG. 1 is a visible absorption spectrum of one of the cyanine dyes of the present invention.

The present invention solves the above object by providing the trimethine cyanine dyes represented by Formula 1, which have the solubility of at least 50 mg/ml in diacetone alcohol (abbreviated as "DAA" hereinafter) at 20° C., and have decomposition points of over 272° C. (the trimethine cyanine dyes may be called "cyanine dyes" hereinafter).

Formula 1

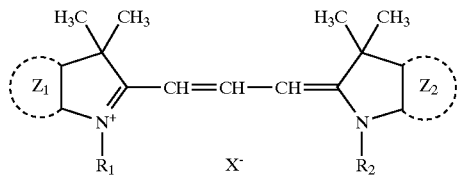

In Formula 1, $R_1$ and $R_2$ independently represent an aliphatic hydrocarbon group which is usually selected from those having up to 8 carbon atoms, such as methyl, ethyl, ethynyl, propyl, isopropyl, 1-propenyl, 2-propenyl, 2-propynyl, isopropenyl, butyl, isobutyl, sec-butyl, tert-butyl, 2-butenyl, 1,3-butadienyl, pentyl, isopentyl, neopentyl, tert-pentyl, 1-methylpentyl, 2-methylpentyl, 2-pentenyl, 2-penten-4-ynyl, hexyl, isohexyl, 5-methylhexyl, heptyl, and octyl groups. These aliphatic hydrocarbon groups may have one or more substituents, for example, aliphatic hydrocarbon groups such as methyl, ethyl, propyl, isopropyl, butyl, isobutyl, sec-butyl, tert-butyl, pentyl, isopentyl, neopentyl and tert-pentyl groups; aromatic hydrocarbon groups such as phenyl, o-tolyl, m-tolyl, p-tolyl, xylyl, mesityl, o-cumenyl, m-cumenyl, p-cumenyl, and biphenyl groups; ethers such as methoxy, trifluoromethoxy, ethoxy, propoxy, isopropoxy, buthoxy, tert-buthoxy, pentyloxy, phenoxy, and benzyloxy groups; esters such as methoxycarbonyl, trifluoromethoxycarbonyl, ethoxycarbonyl, propoxycarbonyl, acetoxy, trifluoroacetoxy, and benzoyloxy groups; and halogens such as fluorine, chlorine, bromine, and iodine. Depending on the whole structures of the cyanine dyes, $R_1$ and $R_2$ are differently aliphatic hydrocarbons represented by $C_mH_{2m+1}$ and $C_nH_{2n+1}$, where n and m are natural numbers and counted nine or less in total. Most of the cyanine dyes have relatively-high solubility in non-halogen solvents such as diacetone alcohol (abbreviated as "DAA" hereinafter) and relatively-high decomposition points. The cyanine dyes have a characteristic of relatively-high heat resistance.

$Z_1$ and $Z_2$ in Formula 1 independently represent a fused naphthalene ring to form a benzoindolenin ring. Usually, the benzoindolenin ring independently has either 1H-benzo [e] indole skeleton or 3H-benzo [g] indole skeleton. One or more hydrogen atoms in the fused naphthalene ring may be replaced with substituents, and the substituents include, for example, aliphatic hydrocarbon groups such as methyl, ethyl, propyl, isopropyl, butyl, isobutyl, sec-butyl, tert-butyl, pentyl, isopentyl, neopentyl and tert-pentyl groups; ethers such as methoxy, trifluoromethoxy, ethoxy, propoxy, isopropoxy, buthoxy, tert-buthoxy, pentyloxy, phenoxy, and benzyloxy groups; esters such as methoxycarbonyl, trifluoromethoxycarbonyl, ethoxycarbonyl, propoxycarbonyl, acetoxy, trifluoroacetoxy, and benzoyloxy groups; alkyl sulfonyl groups such as meythylsulfonyl, ethylsulfonyl, propylsulfonyl, isopropylsulfonyl, buthylsulfonyl, tert-buthylsulfonyl, and pentylsulfonyl groups; alkyl sulfamoyl groups such as methylsulfamoyl dimethylsulfamoyl, ethylsulfamoyl, diethylsulfamoyl, propylsulfamoyl, dipropylsulfamoyl, buthylsulfamoyl, dibuthylsulfamoyl, pentylsulfamoyl, and dipentylsulfamoyl groups; halogens such as fluorine, chlorine, bromine, and iodine; and nitro and cyano groups. The cyanine dyes of the present invention include cis/trans isomers of the cyanine dyes represented by Formula 1.

$X^-$ in Formula 1 represents a suitable counter ion. Depending on uses, such a counter ion is not limited and appropriately selected on the basis of its solubility in DAA and/or heat resistance. When used in optical recording media, the counter ion which does not substantially change the quality of reflection layers including metals, and more particularly, anions comprising two or more kinds of elements are desirable. Examples of such anions are inorganic acid ions such as phosphoric acid ion, perchloric acid ion, periodic acid ion, hexafluoro phosphoric acid ion, hexafluoro antimonic acid ion, hexafluoro stannic acid ion, fluoroboric acid ion, and tetrafluoroboric acid ion; organic acid ions such as thiocyanic acid ion, benzensulfonic acid ion, naphthalenesulfonic acid ion, p-toluenesulfonic acid ion, alkylsulfonic acid ion, benzencarbonic acid ion, alkylcarbonic acid ion, trihaloalkylcarbonic acid ion, alkylsulfonic acid ion, trihaloalkylsulfonic acid ion, and nicotinic acid ion; and organic metal complex anions such azo, bisphenyldithiol, thiocatechol chelate, thiobisphenorate chelate, and bisdiol-α-diketone. Judging from stability such as explosiveness and ease of handling, anions, which comprise fluorine and metal elements selected from those of the 15 group in the periodic law table such as phosphorus, antimony and bismuth, are desirable; hexafluoro phosphoric acid ion and hexafluoro antimonic acid ion. The cyanine dyes of the present invention bearing these anions as a counter ion are characteristic in that they have relatively-high heat resistance, easy handlability, and solubility in organic solvents such as DAA.

Further explaining the counter ion of $X^-$, depending on uses, desirable anions for the cyanine dyes of the present invention are organic metal complex anions which improve light resistance, and more particularly, azo organic metal complex anions. In the present invention, azo organic metal complex anions mean a series of complex anions which have a metal atom as a central atom and bind one or more azo compounds as a ligand to the central atom. All azo organic metal complex anions, which do not substantially lower light absorptance of the cyanine dyes and improve light resistance thereof in practical use, can be used independently of their chemical structures and production methods. Azo compounds which bind to a metal atom may be identical or different each other. The azo organic metal complexes are, for example, those represented by Formula 6. Since the azo organic metal complexes represented by Formula 6 do not substantially lower light absorptance of the cyanine dyes, they can be advantageously used in the present invention.

Formula 6

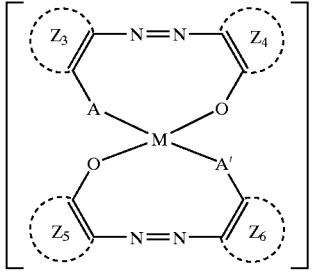

In Formula 6, $Z_3$ through $Z_6$ represent identical or different aromatic rings or heterocycles which may contain one or more substituents. Preferably, the aromatic rings are monocyclic benzene rings, and the heterocycles which contain one or more hetero atoms selected from nitrogen, oxygen, sulfur, selenium and tellurium, for example, those with isooxazolone skeleton, indazolone skeleton, indandione skeleton, oxazolone skeleton, thionaphthene skeleton, barbituric acid skeleton, hydantoin skeleton, pyrazolone skeleton or rhodanine skeleton.

The aromatic rings and heterocycles may have one or more of the following substituents; aliphatic hydrocarbon groups such as methyl, ethyl, propyl, isopropyl, butyl, isobutyl, sec-butyl, tert-butyl, pentyl, isopentyl, neopentyl, tert-pentyl, 1-methylpentyl, 2-methylpentyl, hexyl, isohexyl, and 5-methylhexyl groups; alicyclic hydrocarbon groups such as cyclopropyl, cyclobuthyl, cyclopentyl, cyclohexyl, and cyclohexenyl groups; aromatic hydrocarbon groups such as phenyl, biphenyl, o-tolyl, m-tolyl, p-tolyl, o-cumenyl, m-cumenyl, p-cumenyl, xylyl, mesityl, styryl, cinnamoyl, and naphthyl groups; esters such as methoxycarbonyl, ethoxycarbonyl, propoxycarbonyl, acetoxy, and benzoyloxy groups; substituted or unsubstituted aliphatic, alicyclic or aromatic amino groups such as primary amino, methylamino, dimethylamino, ethylamino, diethylamino, propylamino, dipropylamino, isopropylamino, diisopropylamino, buthylamino, and dibuthylamino groups; alkylsulfamoyl groups such as methylsulfamoyl, dimethylsulfamoyl, ethylsulfamoyl, diethylsulfamoyl, propylsulfamoyl, dipropylsulfamoyl, isopropylsulfamoyl, diisopropylsulfamoyl, butylsulfamoyl, and dibutylsulfamoyl groups; carbamoyl, carboxy, cyano, nitro, hydroxy, sulfo, sulfoamino, and sulfonamido groups.

Depending on uses, one or more hydrogens in the above substituents may be replaced with the following groups; aliphatic hydrocarbon groups such as methyl, ethyl, propyl, isopropyl, butyl, isobutyl, sec-butyl, tert-butyl, pentyl, isopentyl, tert-pentyl, 1-methylpentyl, 2-methylpentyl, hexyl, isohexyl, and 5-methylhexyl groups; aromatic hydrocarbon groups such as phenyl, biphenyl, o-tolyl, m-tolyl, p-tolyl, o-cumenyl, m-cumenyl, p-cumenyl, xylyl, mesityl, styryl, cinnamoyl, and naphthyl groups; ethers such as methoxy, ethoxy, propoxy, isopropoxy, buthoxy, isobuthoxy, sec-buthoxy, tert-buttery, pentyloxy, phenoxy, and benzyloxy groups; halogens such as fluorine, chlorine, bromine, and iodine; and carboxy, hydroxy, cyano, and nitro groups.

As described above, azo organic metal complex anions represented by Formula 6 can be obtained by combining a metal atom of M with one or more azo compounds as a ligand, which are identical or different each other. The metal atom is usually selected from metal elements of the 3 through 12 groups in the periodic law table such as scandium, yttrium, titanium, zirconium, hafnium, vanadium, niobium, tantalum, chrome, molybdenum, tungsten, manganese, technetium, rhenium, iron, ruthenium, osmium, cobalt, rhodium, iridium, nickel, palladium, platinum, copper, silver, gold, zinc, cadmium and mercury. In the field of optical recording media, cobalt and nickel are usually used because they are easily obtainable and handlable. A and A' in Formula 6 represent identical or different hetero atoms selected from elements of the 16 group in the periodic law table such as oxygen, sulfur, selenium and tellurium, and they can form a coordinate bond by providing an electron pair to the above metal atom and may form an atomic group combined with $Z_3$ and $Z_6$.

The azo organic metal complex anions are, for example, those represented by Chemical Formulae 1 to 12. In using these anions as a counter ion for the cyanine dyes of the present invention, they can be advantageously used in the present invention because they remarkably improve the light resistance of the cyanine dyes at wavelengths of 350–850 nm and do not substantially spoil desirable light absorptance and solubility in organic solvents of the cyanine dyes. All of azo organic metal complex anions represented by Chemical Formulae 1 to 12 can be obtained in a satisfactory yield in accordance with well-known methods which provide aniline or aniline derivatives in diazo coupling reaction and allow to react the obtained azo compound in the presence of suitable metal salts and bases. Cyanine dyes with azo organic metal complex anions as a counter ion are prepared by heating the cyanine dyes of the present invention with anions other than azo organic metal complex anions as a counter ion and salts of the above azo organic metal complex anions in a suitable solvent at over ambient temperature for 0.1–10 hours under stirring condition.

Chemical Formula 1

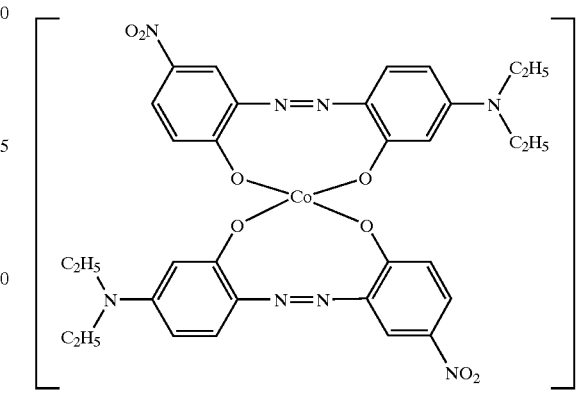

Chemical Formula 2

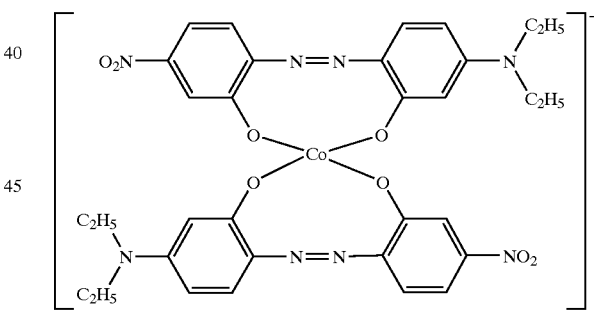

Chemical Formula 3

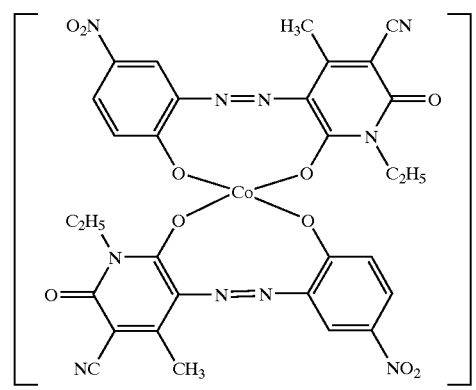

Chemical Formula 4
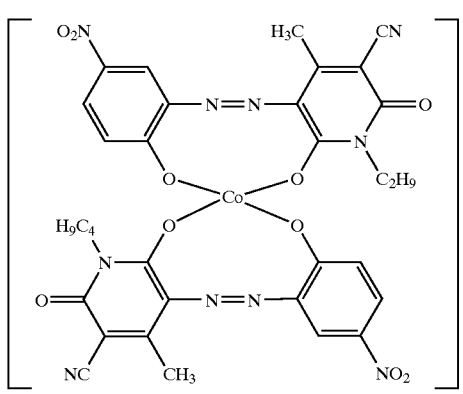
Chemical Formula 5
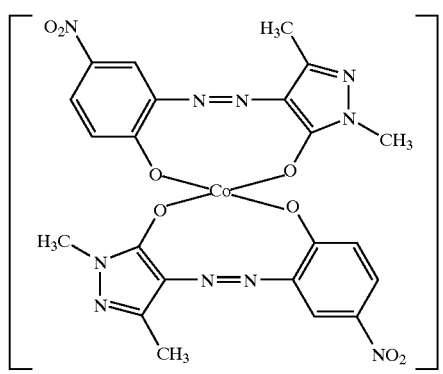
Chemical Formula 6
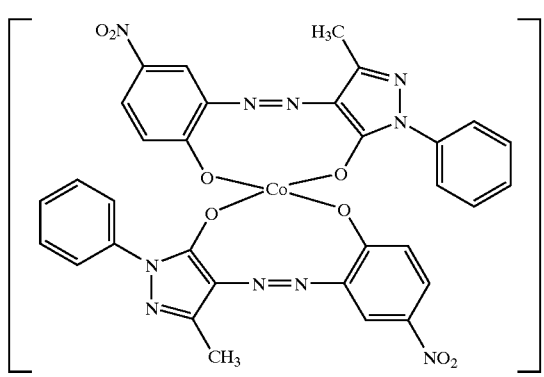
Chemical Formula 7
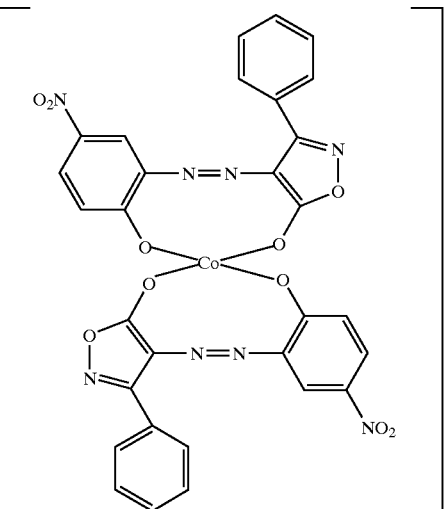
Chemical Formula 8
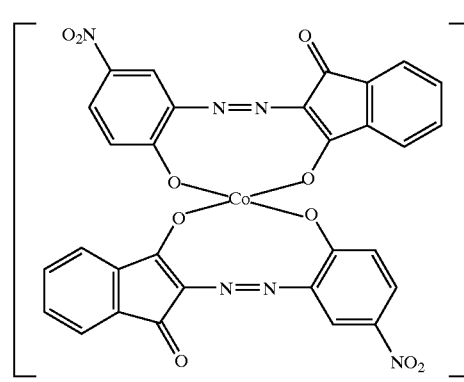
Chemical Formula 9
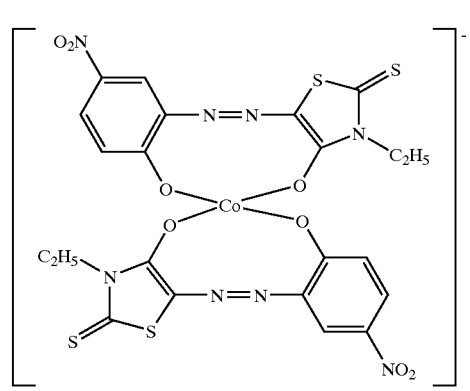

Chemical Formula 10

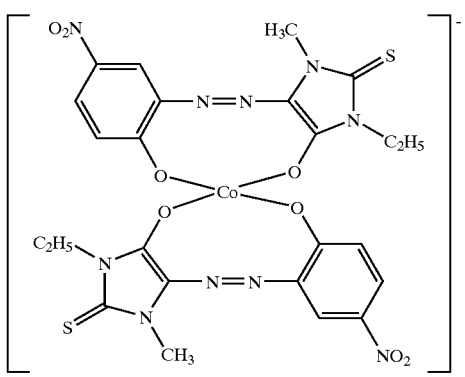

Chemical Formula 11

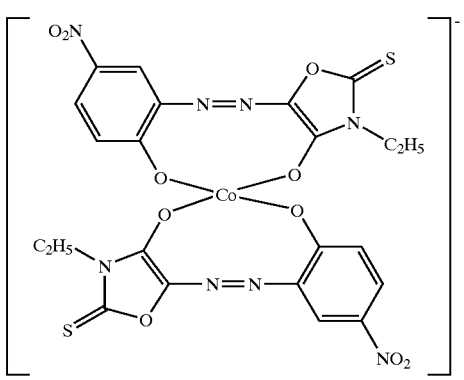

Chemical Formula 12

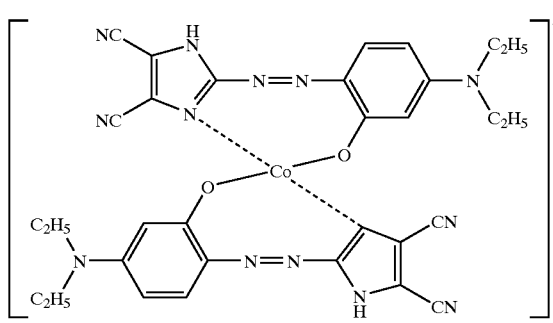

Concrete examples of the cyanine dyes of the present invention are those represented by Chemical Formulae 13 to 72, which have absorption maximum spectra at a wavelength of 580–600 nm when in a solution form and substantially absorb a visible light with a wavelength of shorter than 700 nm in a longer wavelength region of the absorption maximum when in a thin layer form. These cyanine dyes are very useful as light absorbents of optical recording media using a visible light with a wavelength of shorter than 700 nm as a writing light, and more particularly, high-density optical recording media such as DVD-Rs, etc., which use a laser beam with a wavelength of 630–680 nm as a writing light. The cyanine dyes of the present invention, which have an organic metal complex anion, and more particularly, azo organic metal complex anion as a counter ion, remarkably have an ability to improve the light resistance when compared with other cyanine dyes. Thus, they are useful as light absorbents in DVD-R and light resistance improvers in recording media such as CD-R which have recording layers composed of cyanine dyes and use a visible light with a wavelength from 700 to 800 nm as a writing light, and usually a laser beam with a wavelength of around 775–795 nm. The cyanine dyes of the present invention with organic metal complex anions as counter ions (I) can remarkably improve the light resistance without substantially changing the light absorbability of optical recording media when used in combination with the cyanine dyes of the present invention with anions other than azo organic metal complex anions as counter ions (II), and more particularly, perchloric acid ion, fluorine and anions selected from metal elements from the 15 group in the periodic law table in high-density optical recording media. The weight ratio of the above cyanine dyes (I) and (II) can be lowered and highered within the range from 0.1:1 to 1:0.1, and more preferably from 0.3:1 to 1:0.3.

Chemical Formula 13

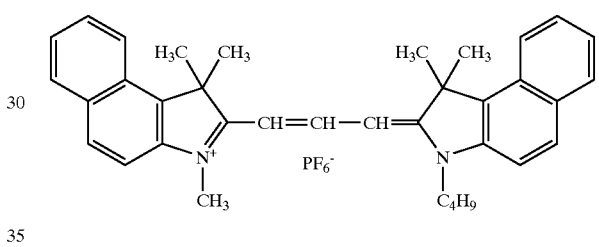

Chemical Formula 14

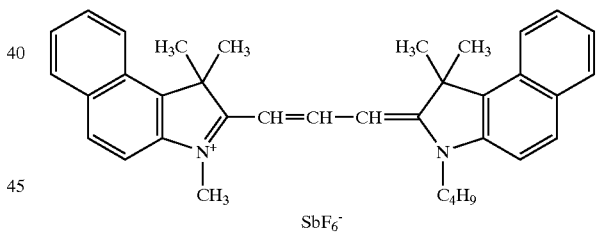

Chemical Formula 15

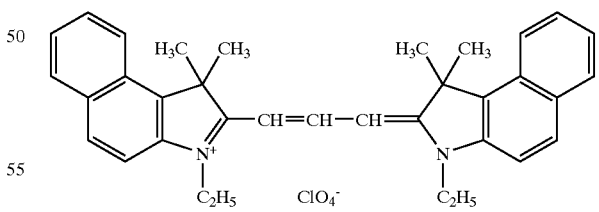

Chemical Formula 16

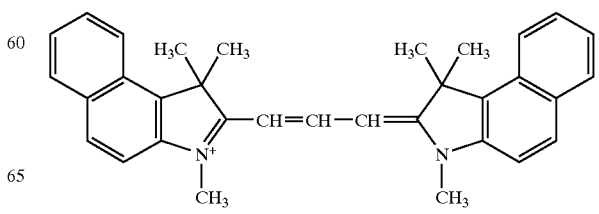

-continued
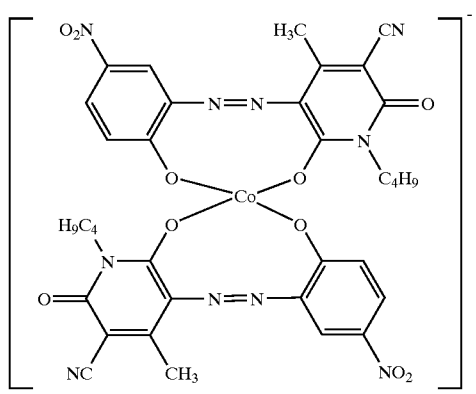
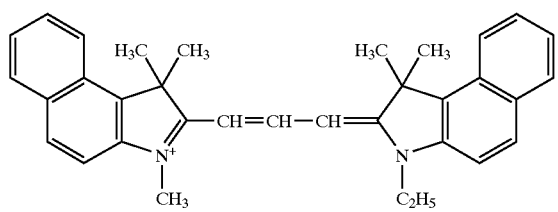
Chemical Formula 17
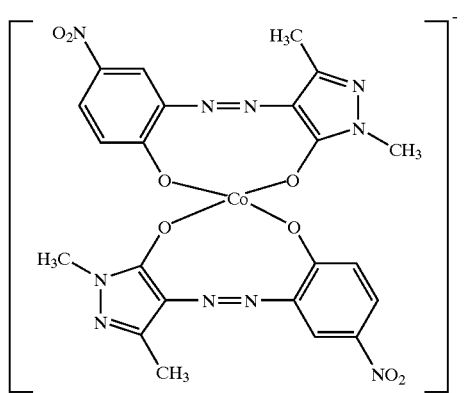
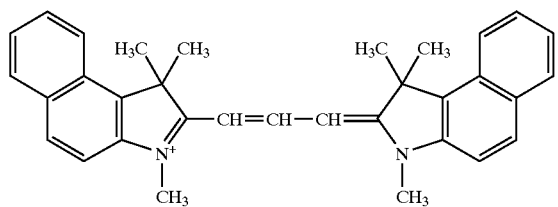
Chemical Formula 18
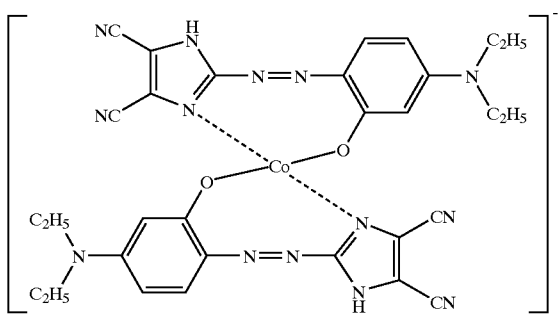
Chemical Formula 19
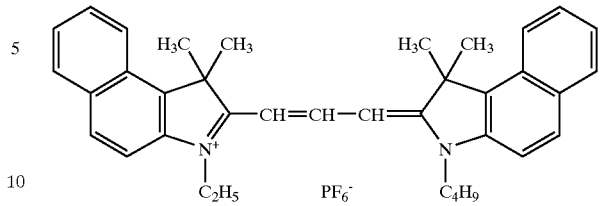
Chemical Formula 20
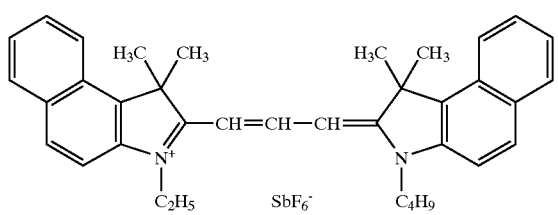
Chemical Formula 21
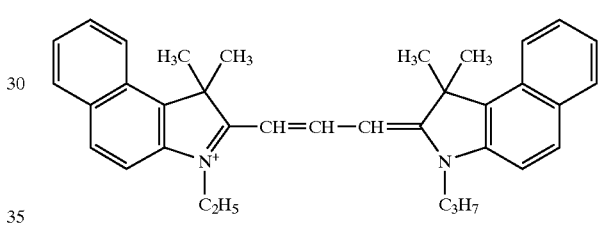
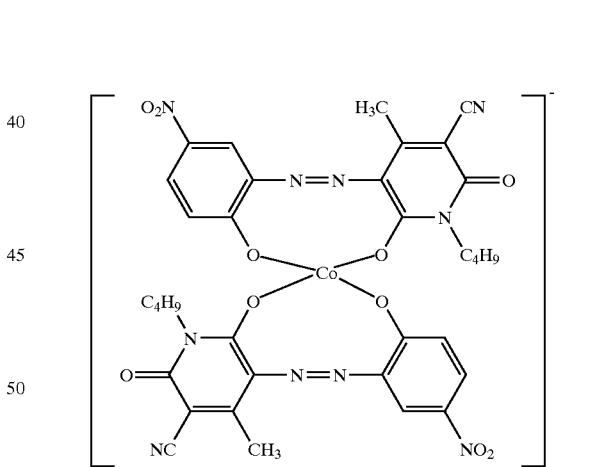
Chemical Formula 22
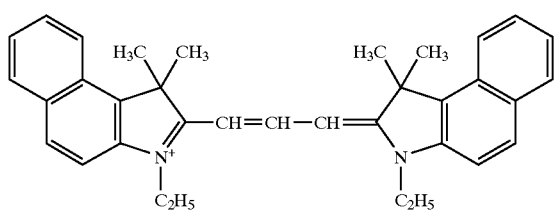

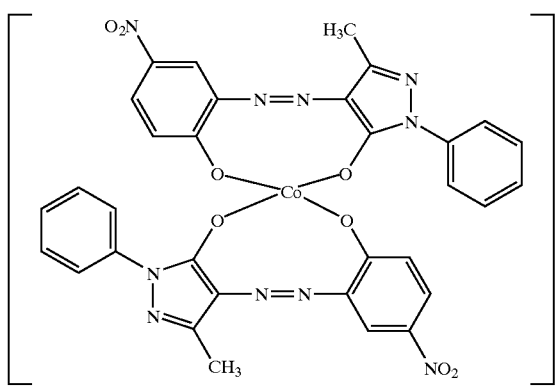
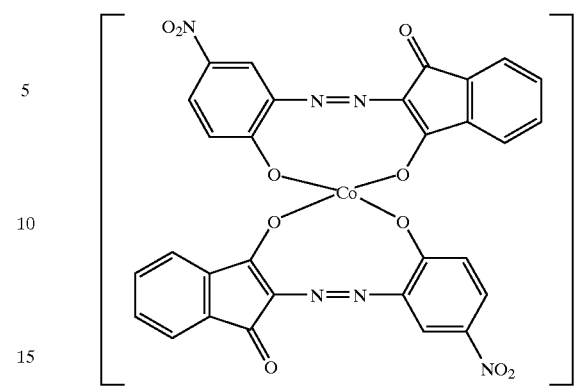
Chemical Formula 23
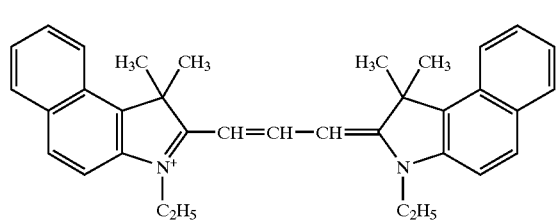
Chemical Formula 25
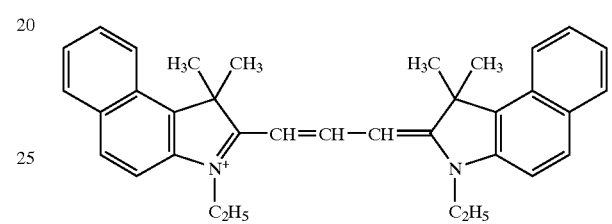
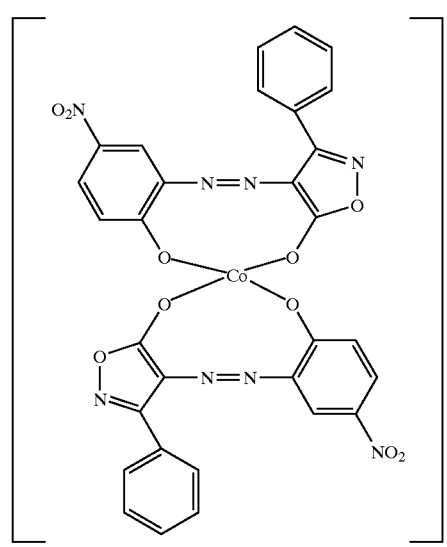
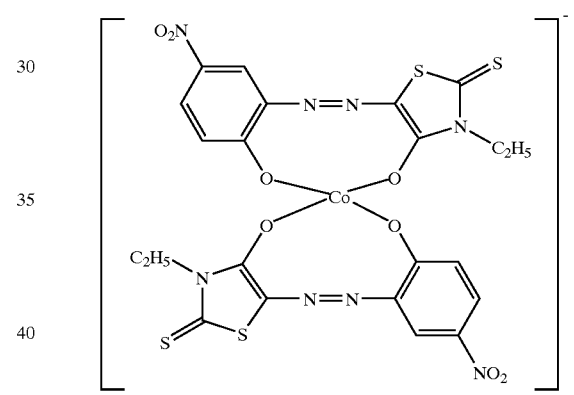
Chemical Formula 26
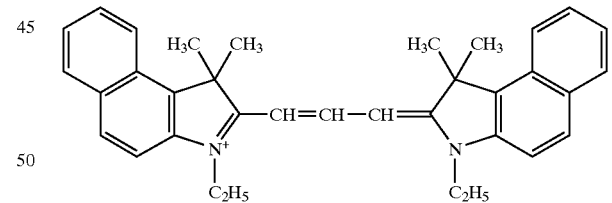
Chemical Formula 24
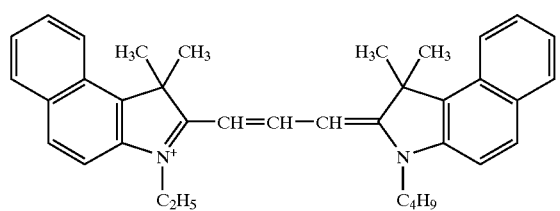
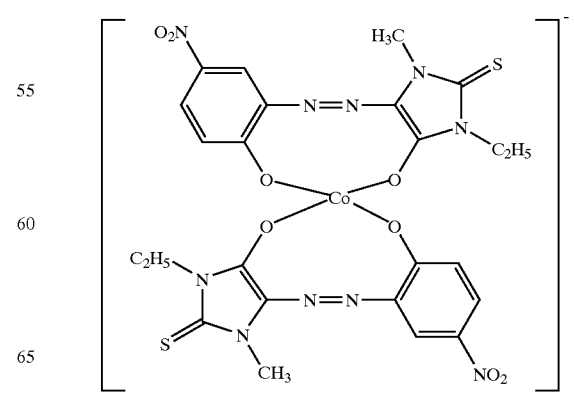

Chemical Formula 27
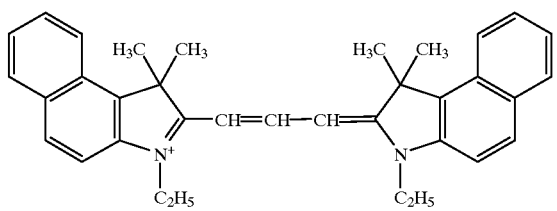
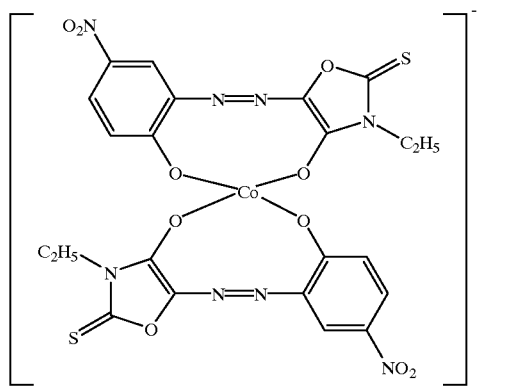
Chemical Formula 28
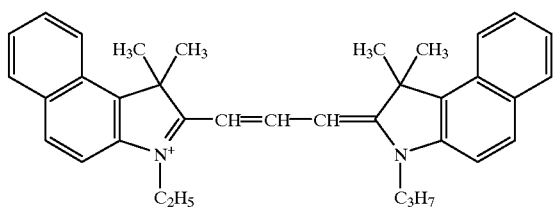
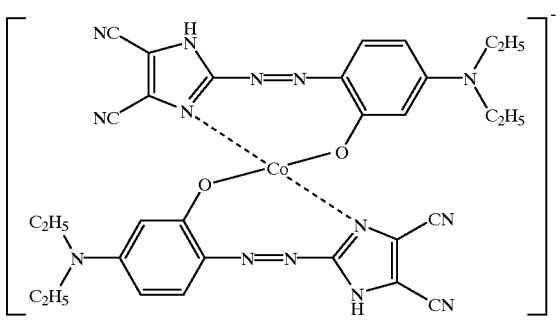
Chemical Formula 30
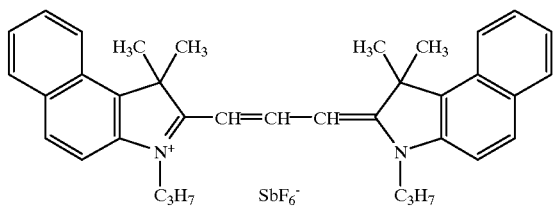
Chemical Formula 31
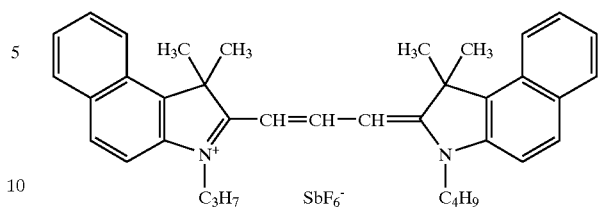
Chemical Formula 32
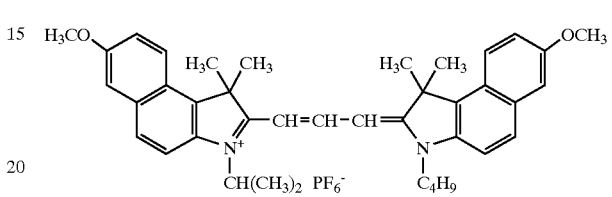
Chemical Formula 33
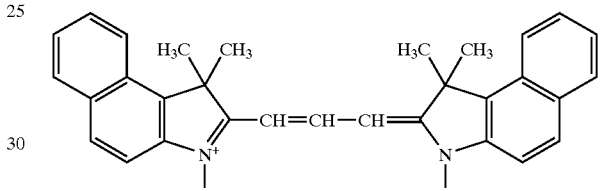
Chemical Formula 34
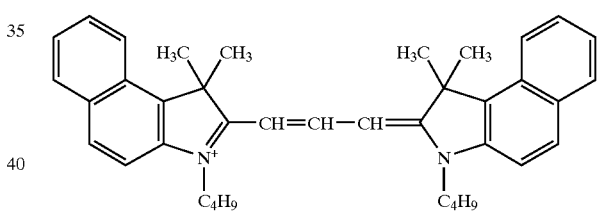
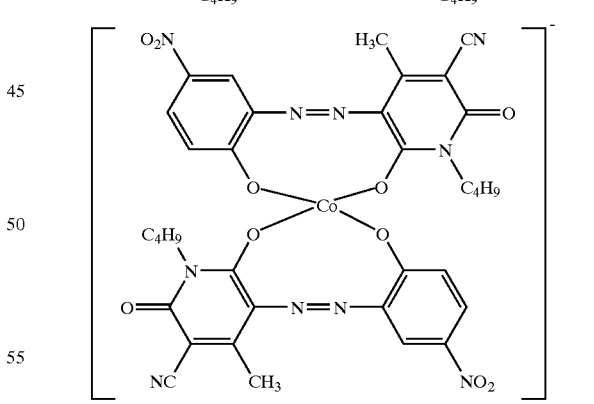
Chemical Formula 35
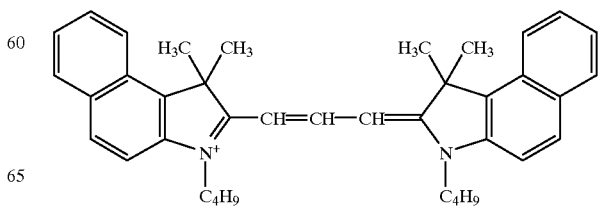

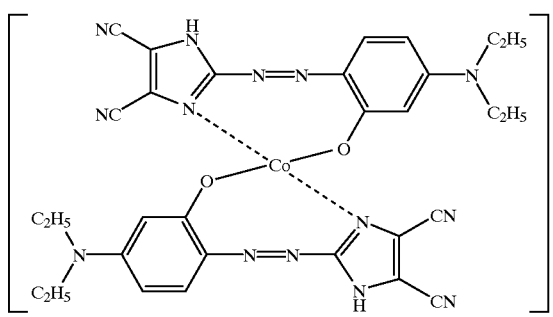
Chemical Formula 36
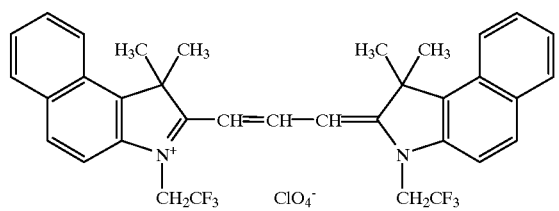
Chemical Formula 37
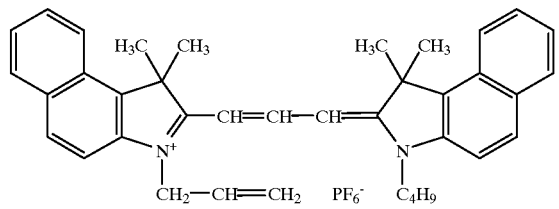
Chemical Formula 38
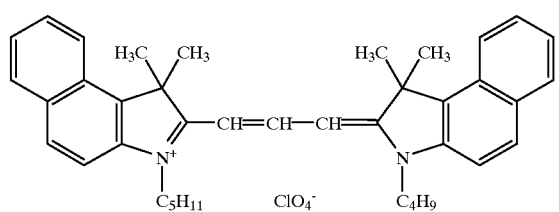
Chemical Formula 39
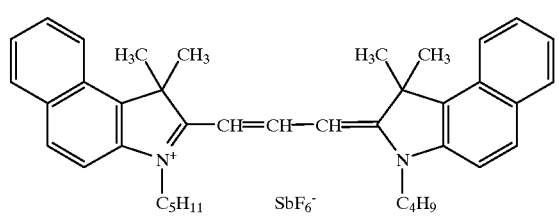
Chemical Formula 40
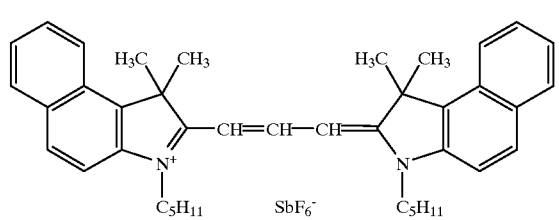
Chemical Formula 41
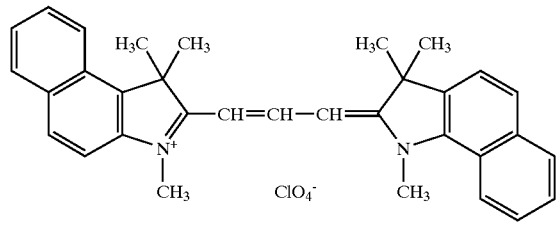
Chemical Formula 42
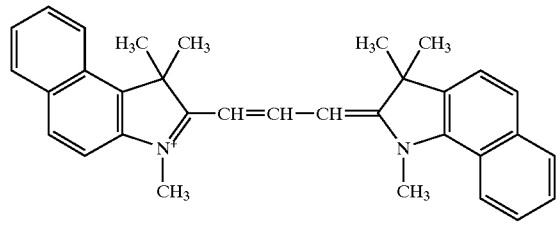
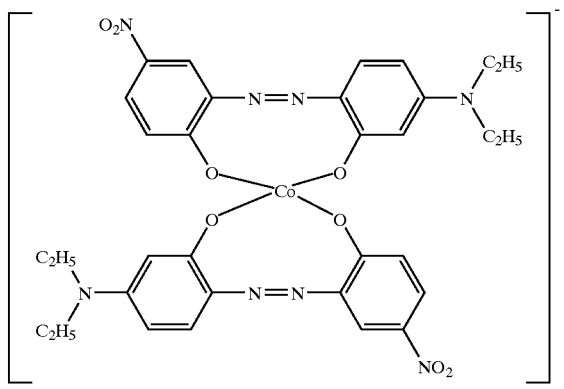
Chemical Formula 43
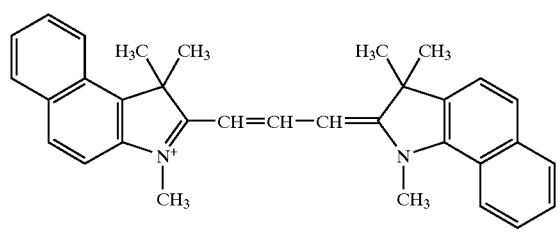
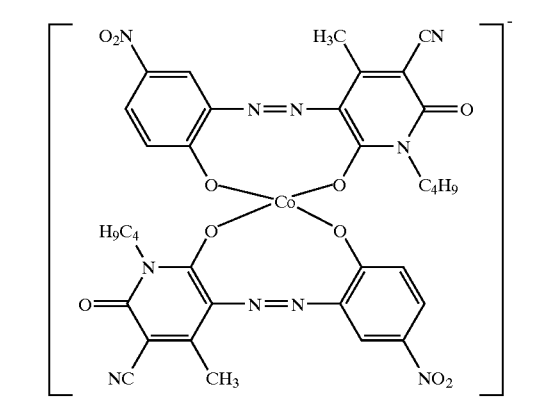

Chemical Formula 44
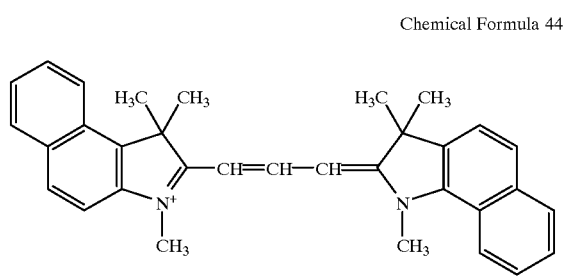
Chemical Formula 45
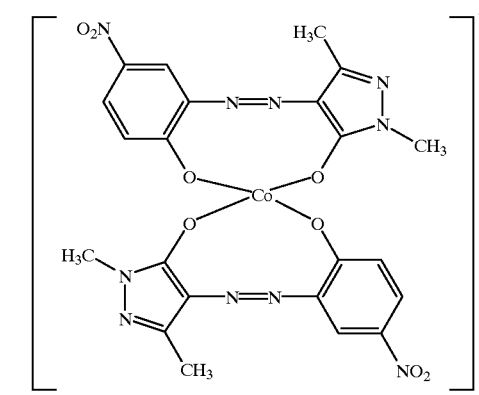
Chemical Formula 46
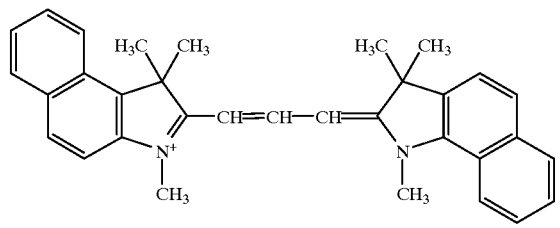
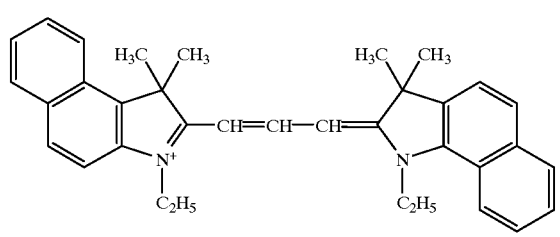
Chemical Formula 47
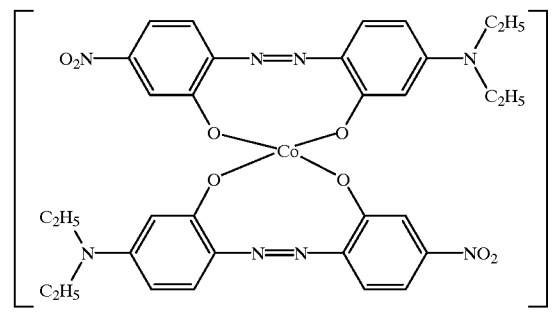
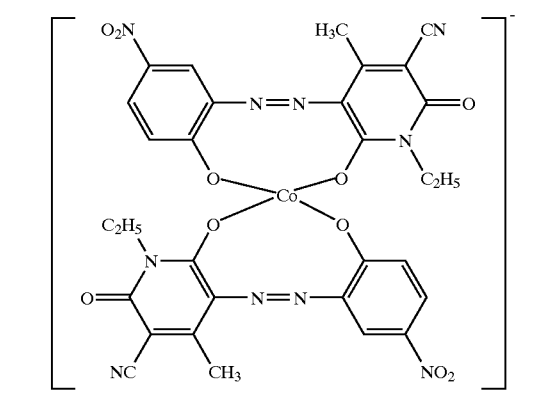
Chemical Formula 48
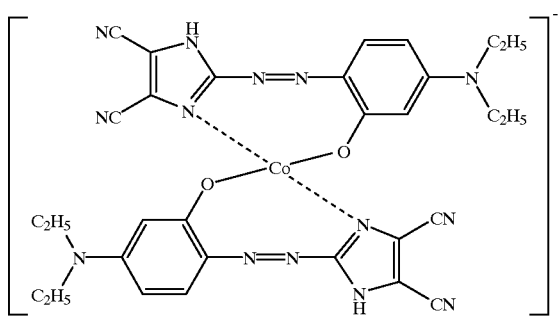
Chemical Formula 49
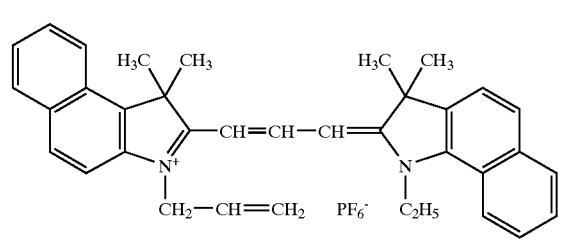

Chemical Formula 50
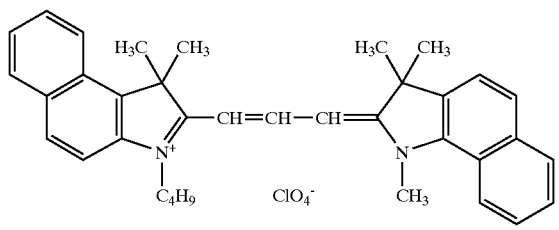
Chemical Formula 51
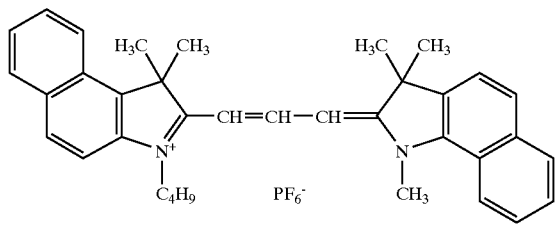
Chemical Formula 52
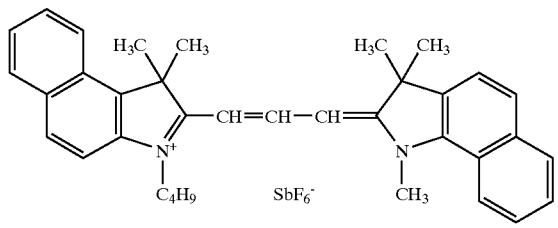
Chemical Formula 53
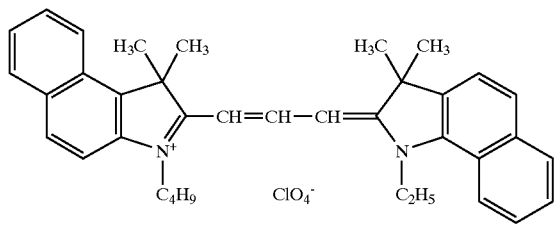
Chemical Formula 54
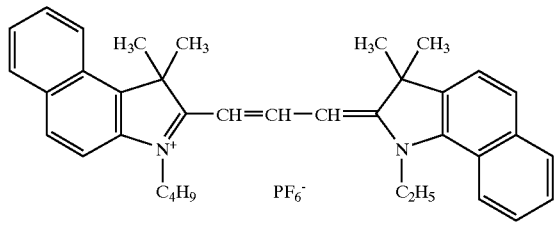
Chemical Formula 55
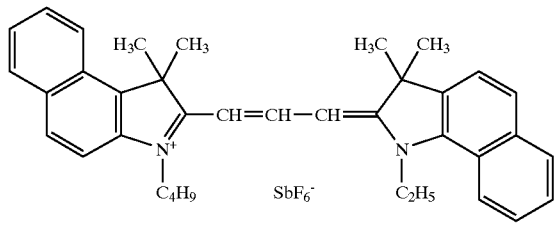
Chemical Formula 56
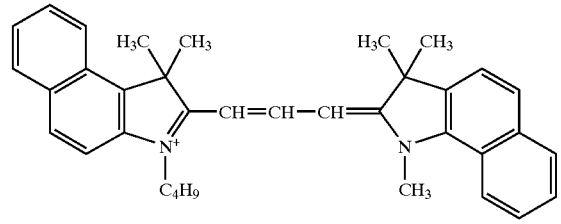
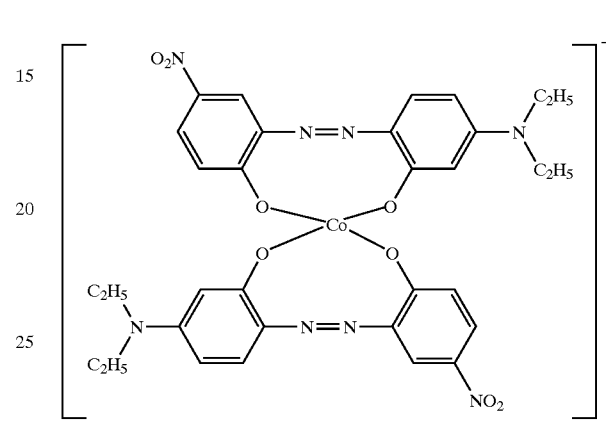
Chemical Formula 57
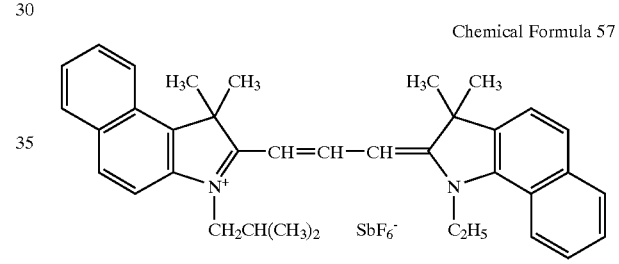
Chemical Formula 58
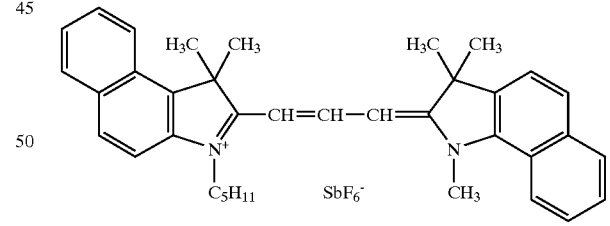
Chemical Formula 59
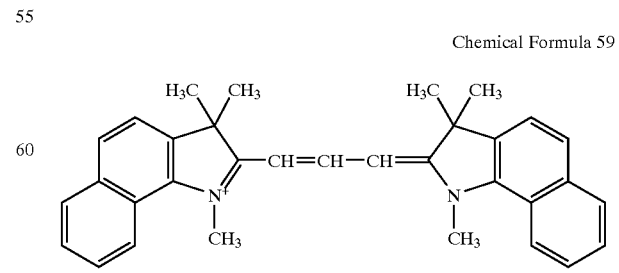

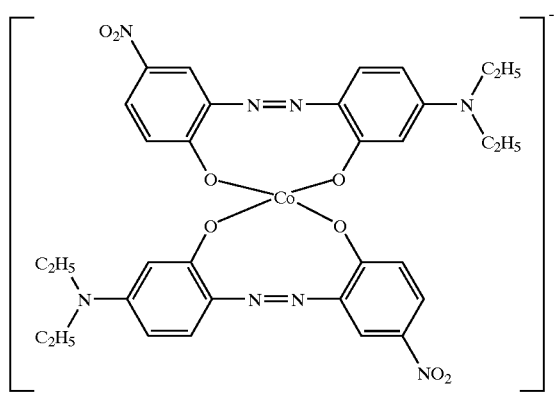
Chemical Formula 60
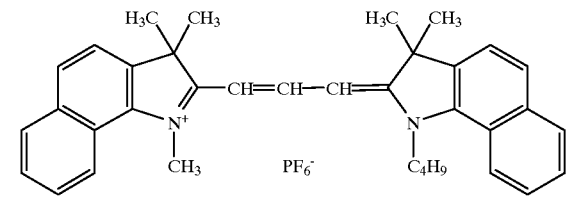
Chemical Formula 65
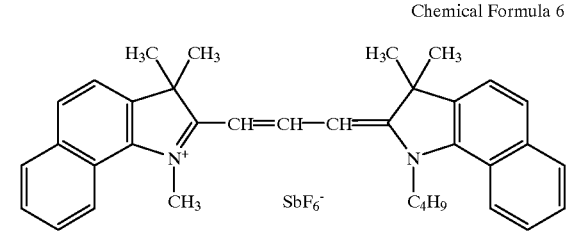
Chemical Formula 66
Chemical Formula 61
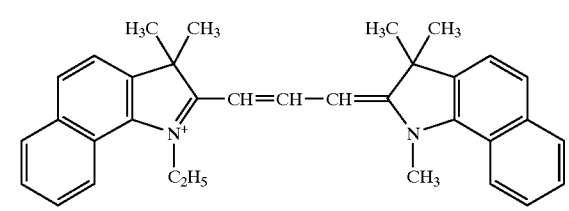
Chemical Formula 67
Chemical Formula 62
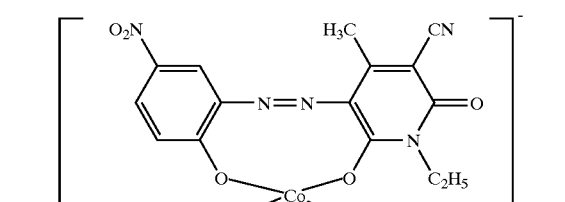
Chemical Formula 63
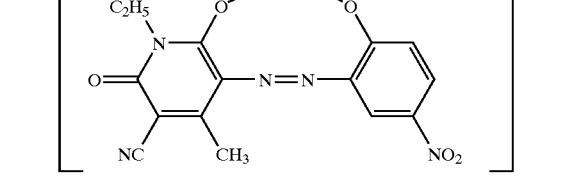
Chemical Formula 68
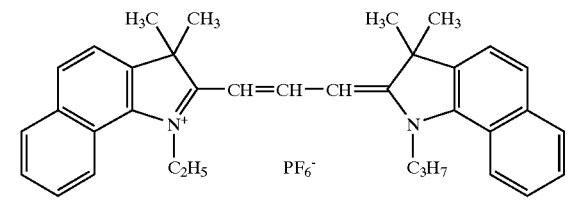
Chemical Formula 64
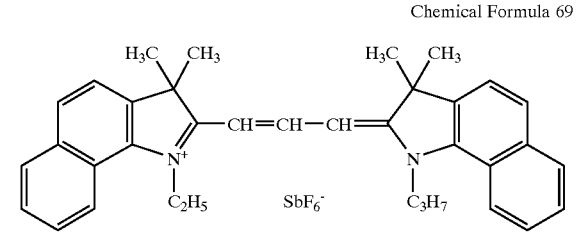
Chemical Formula 69

Chemical Formula 70

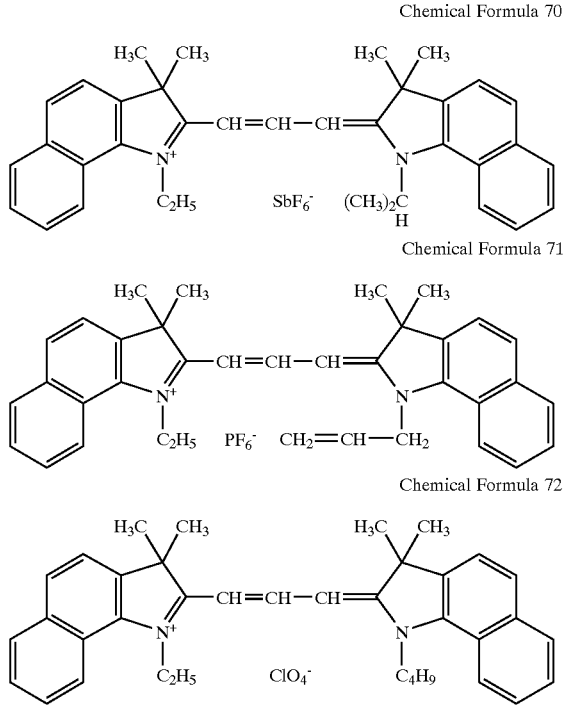

Chemical Formula 71

Chemical Formula 72

These cyanine dyes of the present invention can be prepared by various methods. They can be preferably produced through a step to react a benzoindolenium compound bearing an active methyl group with a benzoindolenium compound bearing a suitable leaving group with an economical view point. With the method, the cyanine dyes of the present invention can be produced in a desirable yield by reacting a compound represented by Formula 2 having $R_1$ in Formula 1 with a compound represented by Formula 3 having $R_2$ in Formula 1; or reacting a compound represented by Formula 4 having $R_1$ in Formula 1 with a compound represented by Formula 5 having $R_2$ in Formula 1.

Formula 2

Formula 3

Formula 4

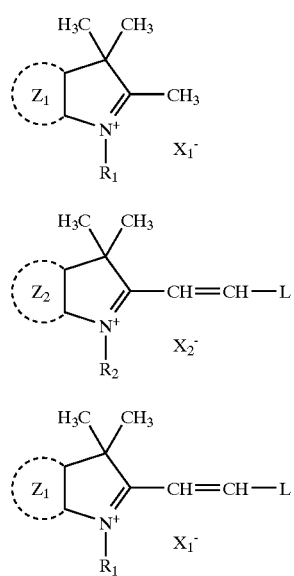

Formula 5

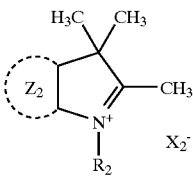

For example, adequate amounts (usually about equal mols) of the compounds represented by Formulae 2 and 3 or those represented by Formulae 4 and 5 are placed in a reaction vessel, and the resulting mixture is dissolved in an adequate solvent, and then reacted at ambient temperature or over ambient temperature under heating and stirring conditions, for example, heating reflux conditions, in the presence of a basic compound such as sodium hydroxide, potassium hydroxide, sodium carbonate, potassium carbonate, sodium carbohydrate, ammonia, triethylamine, piperidine, pyridine, pyrrolidine, morpholine, aniline, N,N-dimethylaniline, N,N-diethylaniline, N-methylpyrrolidone, or 1,8-diazabicyclo [5.4.0]-7-undecene; an acid compound such as hydrochloric acid, sulfuric acid, nitric acid, methanesulfonic acid, p-toluenesulfonic acid, acetic acid, acetic anhydride, propionic anhydride, trifluoroacetic acid, or trifluorosulfonic acid; or a Lewis acid compound such as aluminium chloride, zinc chloride, tin tetrachloride, or titanium tetrachloride.

The following solvents can be used: Hydrocarbons such as pentane, hexane, cyclohexane, octane, benzene, toluene, and xylene; halogen compounds such as carbon tetrachloride, chloroform, 1,2-dichloroethane, 1,2-dibromoethane, trichloroethylene, tetrachloroethylene, chlorobenzene, bromobenzene, and α-dichlorobenzene; alcohols and phenols such as methanol, ethanol, 1-propanol, 2-propanol, 1-butanol, 2-butanol, isobutyl alcohol, isopentyl alcohol, cyclohexanol, ethylene glycol, propylene glycol, 2-methoxyethanol, 2-ethoxyethanol, phenol, benzyl alcohol, cresol, diethylene glycol, triethylene glycol, and glycerin; ethers such as diethyl ether, diisopropyl ether, tetrahydrofuran, tetrahydropyran, 1,4-dioxane, anisole, 1,2-dimethoxyethane, diethylene glycol, dimethyl ether, dicyclohexyl-18-crown-6, methylcarbinol, and ethylcarbitol; ketones such as furfural, acetone, ethyl methyl ketone, and cyclohexanone; acids and acidic derivatives such as acetic acid, acetic anhydride, trichloroacetic acid, trifluoroacetic acid, propionic anhydride, ethyl acetate, butyl carbonate, ethylene carbonate, propylene carbonate, formamide, N-methylformamide, N,N-dimethylformamide, N-methylacetoamide, N,N-dimethylacetoamide hexamethylphosphoric triamide, and phosphoric trimethyl; nitriles such as acetonitrile, propionitrile, succinonitrile, and benzonitrile; nitro compounds such as nitromethane and nitrobenzene; sulfur-containing compounds such as dimethylsulfoxide; and water. These solvents can be appropriately used in combination, if necessary.

In general, the reactivity decreases as the volume of solvent increases, while, the uniform heating and stirring becomes difficult and a side reaction causes easily as the volume of solvent decreases. Thus, the volume of solvent is desirably up to 100 times, usually 5 to 50 times of the material compounds by weight. The reaction completes within 10 hours, usually 0.5–10 hours, depending on the kinds of material compounds and reaction conditions. The process of reaction can be monitored in conventional methods, for example, thin-layer chromatography, gas chromatography, and high-performance liquid chromatography. Thereafter, the cyanine dyes of the present invention with desirable counter ions can be obtained from the above reaction mixture directly, and if necessary after treated with conventional counter ion-exchange reaction. Thus, all the cyanine dyes represented by Chemical Formulae 13 to 72 can be easily obtained by the above methods in a desirable yield. All the benzoindolenium compounds represented by Formulae 2 to 5 can be prepared, for example, by a method as disclosed in Japanese Patent Kokai No. 316,655/98 applied for by the present applicant. In Formulae 2 to 5, $X_1^-$ and $X_2^-$ are identically or differently suitable counter ions to $X^-$ in Formula 1, and L is a suitable leaving group which is usually selected from monovalent groups of aniline or aniline derivatives such as anilino, p-toluidino, p-methoxyanilino, p-ethoxycarbonylanilino, and N-acetylanilino groups.

The cyanine dyes thus obtained can be used in the form of a reaction mixture without any further treatment, and usually can be used after purified by the following conventional methods generally used for purifying their related compounds; dissolution, extraction, separation, decantation, filtration, concentration, thin-layer chromatography, column chromatography, gas chromatography, high-performance liquid chromatography, distillation, crystallization, and sublimation. If necessary, two or more of them can be used in combination. For use as a light absorbent in high-density optical recording media such as DVD-Rs, etc., the cyanine dyes of the present invention should preferably be distilled, crystallized, and/or sublimated prior to use.

Explaining the uses of the cyanine dyes of the present invention, they have characteristics in that:

(i) A relatively-high solubility in non-halogenated solvents; solubility of at least 50 mg/ml in DAA at 20° C., and (ii) A strongly-high heat resistance; a decomposition point of over 272° C.

The cyanine dyes of the present invention substantially absorb a visible light with a wavelength of shorter than 700 nm, and more particularly, a visible light with a wavelength of 630–680 nm when in a thin layer form. Thus, the cyanine dyes of the present invention can be widely used in a variety of fields such as optical recording media, photochemical polymerizations, solar batteries and dyeings, which require the dye compounds with the above characteristics. In these uses, they are very useful as a light absorbent in high-density optical recording media such as DVD-Rs which use a visible light with a wavelength of shorter than 700 nm as a writing light, and more particularly, one with a wavelength of 630–680 nm.

Explaining the use in optical recording media, the cyanine dyes of the present invention can be used for preparing optical recording media in accordance with the processes for conventional ones because they do not require any special treatment and processing. For example, the cyanine dyes of the present invention as a light absorbent can be mixed with one or more other organic dye compounds with the properties of substantially absorbing a visible light so as to modulate the reflection and/or absorption by a recording layer, along with one or more light-resistant improvers, binders, dispersing agents, flame retardants, lubricants, antistatic agents, surfactants, thermal interference inhibitor, and plasticizers, if necessary. The resulting mixtures are then dissolved in organic solvents, and the solutions are homogeneously coated over either surface of substrates in such a manner of using spraying, soaking, roller coating, or rotatory coating method; and dried to form thin layers as recording layers made of light absorbents, and if necessary, followed by forming reflection layers to be closely attached on the recording layers by means of vacuum deposition, chemical vapor deposition, sputtering, or implanting method using metals and alloys such as gold, silver, copper, platinum, aluminum, cobalt, tin, nickel, iron, and chromium to impart a reflection efficiency of 45% or more, and preferably 55% or more; forming reflection layers to be closely attached on the recording layers by using commonly used materials for organic reflection layers; or coating over the recording layers ultraviolet ray hardening resins or thermosetting resins, which contain flame retardants, stabilizers, and/or antistatic agents, to protect the recording layers from scratches, dusts, spoils, etc., and then hardening the coatings by either irradiating light or heating to form protection layers to be closely attached on the reflection layers. In substrates with the recording-, reflection- and protection-layers formed as described above, each protection layer is attached together with adhesives or adhesive sheets, etc, or a protective plate with the same material and form as a substrate is attached to a protection layer, if necessary.

As another organic dye compounds usable together with the present cyanine dyes, any organic dye compounds can be used as long as they substantially absorb a visible light and can modulate a light reflection rate and a light absorption rate of a recording layer of an optical recording medium. As the above organic dye compounds, the following compounds can be used in an appropriate combination, if necessary: Acridine dye, azaannulene dye, azo dye, anthraquinone dye, indigo dye, indanthrene dye, oxazine dye, xanthene dye, dioxazine dye, thiazine dye, thioindigo dye, tetrapyrapolphyradine dye, triphenylmethane dye, triphenylthiazine dye, naphthoquinone dye, phthalocyanine dye, benzoquinone dye, benzopyran dye, benzofuranone dye, porphyrin dye, rhodamine dye, and cyanine dye in which the same or different rings are bound to both ends of a polymethine chain such as monomethine, dimethine, trimethine, tetramethine, pentamethine, hexamethine, or heptamethine. The chains and rings may have one or more substituents. Examples of the rings are imidazolin ring, imidazole ring, banzoimidazole ring, α-naphthimidazole ring, β-naphthimidazole ring, indole ring, isoindole ring, indolenine ring, isoindolenine ring, benzoindolenine ring, pyridinoindolenine ring, oxazoline ring, oxazole ring, isooxazole ring, benzooxazole ring, pyridinooxazole ring, α-naphthoxazole ring, β-naphthoxazole ring, selenazoline ring, selenazole ring, benzoselenazole ring, α-naphthselenazole ring, β-naphthselenazole ring, thiazoline ring, thiazole ring, isothiazole ring, benzothiazole ring, α-naphththiazole ring, β-naphththiazole ring, tellurazoline ring, tellurazole ring, benzotellurazole ring, α-naphthtellurazole ring, β-naphthtellurazole ring, acridine ring, anthracene ring, isoquinoline ring, isopyrrole ring, imidanoxaline ring, indandione ring, indazole ring, indaline ring, oxadiazole ring, carbazole ring, xanthine ring, quinazoline ring, quinoxaline ring, quinoline ring, chroman ring, cyclohexanedion ring, cyclopentandion ring, cinnoline ring, thiodiazole ring, thiooxazolidone ring, thiophene ring, thionaphthene ring, thiobarbituric acid ring, thiohydantoin ring, tetrazole ring, triazine ring, naphthalene ring, naphthyridine ring, piperazine ring, pyrazine ring, pyrazole ring, pyrazoline ring, pyrazolidine ring, pyrazolone ring, pyran ring, pyridine ring, pyridazine ring, pyrimidine ring, pyrylium ring, pyrrolidine ring, pyrroline ring, pyrrole ring, phenazine ring, phenanthridine ring, phenanthrene ring, phenanthroline ring, phthalazine ring, pteridine ring, furazane ring, furan ring, purine ring, benzene ring, benzoxazine ring, benzopyran ring, morpholine ring, and rhodanine ring.

The light-resistant improvers used in the present invention are, for example, nitroso compounds such as nitrosodiphenylamine, nitrosoaniline, nitrosophenol, and nitrosonaphthol and metal complexes such as tetracyanoquinodimethane compounds, diimmonium compounds, and "NKX-1199" (bis[2'-chloro-3-methoxy-4-(2-methoxyethoxy)dithiobenzyl] nickel) produced by Hayashibara Biochemical Laboratories, Inc., Okayama, Japan, and formazane metal complexes, which all can be appropriately used in combination, if necessary. Preferable light-resistant improvers are those which contain formazane metal compounds, and most preferable ones are formazane compounds, which have a pyridine-ring at C-5 and a pyridine- or furan-ring at C-3 of a formazane skeleton as disclosed in Japanese Patent Application No. 163,036/99 (PCT Kokai No. WO00/75111), titled "Formazane metal complexes" applied for by the present applicant; and complexes to metals such as nickel, zinc, cobalt, iron, copper, and palladium, which have one or more tautomers of the aforesaid compounds as a ligand. In the case of using such a light-resistant improver in combination, the cyanine dyes of the present invention can be effectively prevented from undesirable changing in deterioration, fading, color changing, and quality changing, which are inducible by environmental lights such reading- and natural-lights, without lowering the solubility of the cyanine dyes in organic solvents and substantially deteriorating preferable optical characteristics. More particularly, formazane metal complexes effectively improve the following features in high-density optical recording media in combination with a mixture of the cyanine dyes of the present invention having the aforesaid organic metal complex anions as a counter ion and the cyanine dyes of the present invention having anions other than azo organic metal complex anions as a counter ion:

(i) light resistance of the cyanine dyes of the present invention, (ii) sensitivity of optical recording media, (iii) modulation characteristic, (iv) resolution, and (v) electrical characteristics such as a jitter characteristic.

As the composition ratio, 0.01–1 moles, and preferably 0.03–0.3 moles of a light-resistant improver(s) can be incorporated into one mole of the present cyanine dye(s) while increasing or decreasing the ratio. Depending on uses, the cyanine dyes of the present invention with organic metal complex anions as a counter ion, and more particularly, azo organic metal complex anions, have a relatively-high light resistance in themselves, and thus the aforesaid light-resistant improvers may not be required or required with only a small amount.

The cyanine dyes of the present invention have satisfactory-high solubility in organic solvents without substantially causing negative problem for actual use, and do not substantially restrict organic solvents used for coating the cyanine dyes on substrates. Thus, in the preparation of optical recording media according to the present invention, suitable organic solvents can be selected from the following ones which are appropriately used in combination: DAA and TFP frequently used to prepare optical recording media and the following organic solvents other than DAA and TFP: For example, hydrocarbons such as hexane, cyclohexane, methylcyclolhexane, dimethylcyclohexane, ethylcyclohexane, isopropylcyclohexane, tert-butylcyclohexane, octane, cyclooctane, benzene, toluene, and xylene; halogen compounds such as carbon tetrachloride, chloroform, 1,2-dichloroethane, 1,2-dibromoethane, trichloroethylene, tetrachloroethylene, chlorobenzene, bromobenzene, and α-dichlorobenzene; alcohols and phenols such as methanol, ethanol, 2,2,2-trifluoroethanol, 2-methoxyethanol (methyl cellosolve), 2-ethoxyethanol (ethyl cellosolve), 2-isopropoxy-1-ethanol, 1-propanol, 2-propanol, 1-methoxy-2-propanol, 1-ethoxy-2-propanol, 1-butanol, 1-methxy-2-butanol, 3-methoxy-1-butanol, 4-methoxy-1-butanol, isobutyl alcohol, isopentyl alcohol, cyclohexanol, ethylene glycol, propylene glycol, glycerine, phenol, benzyl alcohol, and cresol; ethers such as diethyl ether, diisopropyl ether, tetrahydrofuran, tetrahydropyran, 1,4-dioxane, anisole, 1,2-dimethoxyethane, diethylene glycol dimethyl ether, dicyclohexyl-18-crown-6, methylcarbinol, and ethylcarbitol; ketones such as furfural, acetone, ethyl methyl ketone, and cyclohexanone; esters such as ethyl acetate, butyl acetate, ethylene carbonate, propylene carbonate, and trimethyl phosphate; amides such as formamide, N-methyl formamide, N,N-dimethylformamide, and hexamethylphosphoric triamide; nitriles such as acetonitrile, propionitrile, and succinonitrile; nitro compounds such as nitromethane and nitrobenzene; amines such as ethylene diamine, pyridine, piperidine, morpholine, and N-methylpyrrolidone; and sulfur-containing compounds such as dimethylsulfoxide and sulfolane. These organic solvents can be used in an appropriate combination.

Particularly, the cyanine dyes of the present invention have relatively-high solubility in easily-volatile organic solvents such as TFP and DAA, and thus they are substantially free of crystallization when dissolved in the above organic solvents, spun coated on substrates, and then dried without substantially causing dye crystals and inconsistency of the thickness and the surface of the layers formed on optical recording media. When the cyanine dyes of the present invention dissolve in the alcohols such as DAA before coated on the substrates, the solvents do not damage the substrates and pollute the environment.

Conventional substrates can be used in the present invention and usually processed with suitable materials, for example, into discs, 12 cm in diameter and 0.1–1.2 mm in thickness, to suite to final use by the methods such as compression molding, injection molding, compression-injection molding, photopolymerization method (2P method), thermosetting integral method, and lightsetting integral method. These discs can be used in single or plural after appropriately attached them together with adhesive sheets or adhesive agents, etc. In principal, any materials for substrates can be used in the present invention as long as they are substantially transparent and have a transmissivity of at least 80%, and preferably at least 90% or more at wavelengths ranging from 400 nm to 800 nm. Examples of such materials are glasses, ceramics, and others such as plastics including polyacrylate, polymethyl methacrylate, polycarbonate, polystyrene (styrene copolymer), polymethylpenten, polyester, polyolefin, polyimide, polyetherimide, polysulfone, polyethersulfone, polyarylate, polycarbonate/polystyrene alloy, polyestercarbonate, polyphthalatecarbonate, polycarbonateacrylate, non-crystalline polyolefin, methacrylate copolymer, diallylcarbonatediethylene-glycol, epoxy resin, and phenolic resin, where polycarbonate is most frequently used. In plastic substrates, concaves for expression of synchronizing signals and addresses of tracks and sectors are usually transferred to the internal circle of the tracks during their formation. The form of concaves is not specifically restricted and is preferably formed to give 0.3–0.8 µm in average wide and 70–200 nm in depth.

The light absorbents of the present invention can be prepared into 0.5–5 w/w % solutions of the organic solvents as mentioned above while considering the viscosity of the solutions, and then uniformly coated onto a substrate to form a dried recording layer with 10–1,000 nm, and preferably 50–300 nm in thickness. Prior to the coating, a preliminary layer can be formed over the substrate to improve the protection and the adhesion-ability to the substrate, if necessary. Materials of the preliminary layer are, for example, high-molecular substances such as ionomer resins, polyamide resins, vinyl resins, natural resins, silicon, and liquid rubbers. In the case of using binders, the following polymers can be used alone or in combination in a weight ratio of 0.01–10 times of the cyanine dye(s): Cellulose esters such as nitrocellulose, cellulose phosphate, cellulose sulfate, cellulose acetate, cellulose propionate, cellulose lactate, cellulose palmitate, and cellulose acetate/propionate; cellulose ethers such as methyl cellulose, ethyl cellulose, propyl cellulose, and butyl cellulose; vinyl resins such as polystyrene, poly (vinyl chloride), poly(vinyl acetate), poly(vinyl acetal), poly (vinyl butyral), poly(vinyl formal), poly(vinyl alcohol), and poly(vinyl pyrrolidone); copolymer resins such as styrene-butadiene copolymers, styrene-acrylonitrile copolymers, styrene-butadiene-acrylonitrile copolymers, vinyl chloride-vinyl acetate copolymers, and maleic anhydride copolymers; acrylic resins such as poly(methyl methacrylate), poly (methyl acrylate), polyacrylate, polymethacrylate, polyacrylamide, and polyacrylonitrile; polyesters such as poly(ethylene terephthalate); and polyolefins such as polyethylene, chlorinated polyethylene, and polypropylene.

Explaining the method for using the optical recording media according to the present invention, the high density optical recording media of the present invention such as DVD-Rs can write informations at a relatively-high density by using a visible light with a wavelength shorter than 700 nm, and more particularly, a laser beam with a wavelength around 630–680 nm irradiated by semiconductor lasers such as those of AlGaInP, GaAsP, GaAlAs, InGaP, InGaAsP or InGaAlP; or YAG laser combined with second harmonic generation inducing element (SHG element). To read recorded informations, laser beams are used with wavelengths identical to or slightly longer or shorter than those used for writing informations. As for the laser power for writing and reading informations, in the optical recording media of the present invention, it is preferably be set to a relatively-high level, which exceeds the threshold of the energy required for forming pits, to write information, while it is suitably be set to a relatively-low level, i.e., a level of below the threshold when used for reading the recorded informations, although the power levels can be varied depending on the types and ratios of the light-resistant improvers used in combination with the cyanine dyes: Generally, the levels can be controlled to powers at least 5 mW, and usually 10–50 mW for writing; and to powers of 0.1–5 mW for reading. The recorded informations are read by detecting the changes of both the reflection light level and the transmission light level in the pits and the pit-less part on the surface of optical recording media by the light pick-up method.

Accordingly, in the present optical recording media, minute pits with a pit width of below 0.834 µm/pit and a track pitch of below 1.6 µm that is commonly used in a standard CD-R, can be formed at a relatively-high density by a light pick-up using a visible light with a wavelength of shorter than 700 nm, and particularly a laser beam with a wavelength around 630–680 nm. For example, using a substrate, 12 cm in diameter, it can realize an extremely-high density optical recording medium with an optical recording capacity far exceeding 0.682 GB (giga bytes) per one side i.e., a recording capacity of about two hours of information of voices and images, the level of which could hardly be attained by conventional cyanine dyes.

Since the optical recording media of the present invention can record information of characters, images, voices, and other digital data at a relatively-high density, they are extremely useful as recording media for professional and family use to record, backup, and keep documents, data, and computer softwares. Particular examples of the types of industries and the forms of information to which the optical recording media can be applied are as follows: Drawings of constructions and engineering works, maps, ledgers of loads and rivers, aperture cards, architectural sketches, documents of disaster protection, wiring diagrams, arrangement plans, informations of news papers and magazines, local information, and construction specifications, which all relate to constructions and engineering works; blueprints, ingredient tables, prescriptions, product specifications, product price tables, part's lists, information for maintenance, case study files of accidents and troubles, manuals for claims, production schemes, technical documents, sketches, details, company's house-made product files, technical reports, and analysis reports, which are all used in productions; information of companies, records of stock prices, statistical documents, contracts, customer's lists, documents of application/notification/licenses/authorization, and business reports, which are all used in money; information of real property and transportations, sketches of constructions, maps, and local information, which are all used for customer's information for sales; diagrams of writings and pipe arrangements for electric and gas supplies, documents of disaster protection, tables of operation manuals, documents of investigations, and technical reports; medical cartes, files of clinical histories and case studies, and diagrams for medical care/institution relationships, texts, collections of questions, educational documents, and statistical information, which are all used in private and preparatory schools; scientific papers, records in academic societies, monthly reports of researches, data of researches, documentary records and indexes thereof, which are all used in universities, colleges, and research institutes; inspection data, literatures, patent publications, weather maps, analytical records of data, and customer's files, which are all used for information; case studies on laws; membership lists, history notes, records of works/products, competition data, and data of meetings/congresses, which organizations/associations; sightseeing information and traffic information, which are all used for sightseeing; indexes of homemade publications, information of news papers and magazines, who's who files, sport records, telop files, and scripts, which are all used in mass communications and publishers; and maps, ledgers of roads and livers, fingerprint files, resident cards, documents of application/notification/license/authorization, statistical documents, and public documents, which are all used in government offices. Particularly, the write-once type optical recording media of the present invention can be advantageously useful for storing records of cartes and official documents, and used as electric libraries for art galleries, libraries, museums, broadcasting stations, etc.

As a rather specific use, the optical recording media of the present invention can be used to edit compact discs, digital video discs, laser discs, MD (a mini disc as an information recording system using photomagnetic disc), CDV (a laser disc using compact disc), DTA (an information recording system using magnetic tape), CD-ROM (a read-only memory using compact disc), DVD-ROM (a read-only memory using digital video disc), DVD-RAM (a writable and readable memory using digital video disc), digital photos, movies, video softwares, audio softwares, computer graphics, publishing products, broadcasting programs, commercial messages, game softwares, etc.; and used as external program recording means for large size of computers and car navigation systems.

Hereinbefore described are the application examples of the cyanine dyes of the present invention to the field of organic optical recording media which use laser beams with wavelengths of shorter than 700 nm as a writing light. However, in the field of optical recording media, the cyanine dyes of the present invention can be also advantageously used as materials for changing or regulating the optical absorption rate or optical reflection rate in the optical recording media such as commonly used CD-Rs and other high-density optical recording media by using in combination, for example, together with one or more other organic dye compounds which are sensitive to laser beams with wavelengths of 775–795 nm. When optical recording media are coated by using laser beams with longer wavelengths such as laser beams with wavelengths of 775–795 nm as a writing light, the cyanine dyes of the present invention can be used not to directly form pits on substrates but to indirectly form pits in such a manner that the excitation energy of laser beams with wavelengths around 630–680 nm is allowed to transfer to the aforesaid organic dye compounds via the cyanine dyes by using the cyanine dyes along with one or more other organic dye compounds which are sensitive to a light with a longer wavelength, e.g., a laser beam with a longer wavelength of 775–795 nm, resulting in a decomposition of the organic dye compounds. The optical recording media as referred to in the present invention mean optical recording media in general which use the characteristics of the cyanine dyes of the present invention that substantially absorb a visible light with a wavelength shorter than 700 nm in addition to organic optical recording media, thermal coloration method using the chemical reaction of coloring agents and developers using the heat generated when organic dye compounds absorb light, and the technique called "moth-eye type technique" which uses the phenomenon of that the above heat smooths the pattern of periodical unevenness provided on the surface of the substrates.

As described above, the cyanine dyes of the present invention are useful as a light-resistant improver in recording media such as CD-Rs which have recording layers composed of cyanine dyes and use a visible light with a wavelength from 700 nm to 800 nm as a writing light, and usually a laser beam with a wavelength around 775–795 nm. In the optical recording media, the cyanine dyes used in combination with the cyanine dyes of the present invention are, for example, pentamethine cyanine dyes in which the same or different 1H-benzo [e] indole skeleton or 3H-benzo [g] indole skeleton are bound to both ends of a pentamethine chain, as disclosed in Japanese Patent Kokai Nos. 203,692/91, 203,693/91, 239,149/93, and 199,045/94 applied for by the same applicant as the present invention. As an additive volume of the cyanine dyes of the present invention for these cyanine dyes, the light resistance is not desirably improved when the additive volume is a relatively-low level, while the electrical characteristic of optical recording media is deteriorated when the additive volume is a relatively-high level. Usually, 0.5–50% (w/w), and preferably 3–30% (w/w), of the cyanine dye(s) of the present invention can be incorporated into other cyanine dye(s) while increasing or decreasing the volume. As a light-resistant improver, one or more other light-resistant improvers can be used with the cyanine dyes of the present invention, if necessarily. For example, formazane metal complexes are more desirably used because they exert good amorphousness and relatively-high heat resistance to the cyanine dyes of the present invention and other cyanine dyes when formed in a thin layer.

When the cyanine dyes of the present invention are used as a light-resistant improver which uses a visible light with a wavelength of longer than 700 nm as a writing light such as CD-Rs, they are not necessarily incorporated into a recording layer. For example, the cyanine dyes of the present invention are incorporated into a preliminary layer, or they are dissolved in suitable solvents with one or more of the aforesaid binders, and the solutions are coated on the whole or the part of surface irradiated by a writing light to form a protection membrane composed of the cyanine dyes of the present invention, if necessarily. The preliminary layer and the protection membrane can protect a recording layer from environmental lights such as natural- and artificial-lights and remarkably improve durability of optical recording media, and more particularly electrical characteristics such as a jitter characteristic and a rate of block error. When the solution is covered on the outside of substrate, informations such as characters, figures, pictures, numerals, and symbols can be printed or written on the outside of substrate by using the solution as a printing material or paint.

Since the cyanine dyes of the present invention substantially absorb a visible light with a wavelength shorter than 700 nm, the light absorbents containing the cyanine dyes according to the present invention can be used in the aforesaid optical recording media and also used as materials for polymerizing polymerizable compounds by exposing a visible light, photosensitizing solar batteries, and dying clothes, as well as materials for laser active substances in dye lasers. If necessary, in combination with one or more other light absorbents capable of absorbing light in ultraviolet, visible and/or infrared regions, the light absorbents can be used in clothes in general and others including building/bedding/decorating products such as a drape, lace, casement, print, casement cloth, roll screen, shutter, shop curtain, blanket, thick bedquilt including comforter, peripheral material for the thick bedquilt, cover for the thick bedquilt, cotton for the thick bedquilt, bed sheet, cushion, pillow, pillow cover, cushion, mat, carpet, sleeping bag, tent, interior finish for car, and window glasses including car window glass; sanitary and health goods such as a paper diaper, diaper cover, eyeglasses, monocle, and lorgnette; internal base sheets, linings, and materials for shoes; wrappers; materials for umbrellas; parasols; stuffed toys; lighting devices; filters, panels and screens for information displaying devices such as televisions and personal computers which use cathode-ray tubes, liquid crystal displays, electrolytic luminous displays, and plasma displays; sunglasses; sunroofs; sun visors; pet bottles; refrigerators; vinyl houses; lawns; optical fibers; prepaid cards; and peeping windows in electric ovens, and other type ovens. When used as wrapping materials, injection materials, and vessels for the above products, the light absorbents of the present invention prevent living bodies and products from troubles and discomforts caused by environmental lights such as natural- and artificial-lights or even lower the troubles and discomforts, and furthermore they can advantageously regulate the color, tint, and appearance and control the light reflected by or passed through the products to a desirable color balance.

The following examples describe the preferred embodiments of the present invention:

EXAMPLE 1

Cyanine Dye

Thirty milliliters of acetonitrile were placed in a reaction vessel, mixed with 15 g of 1-buthyl-3,3-dimethyl-2-[(phenylamino)ethenyl] benzoindolenium=tosylate, and 10.4 g of 1-ethyl-2,3,3-trimethylbenzoindolenium=tosylate, and then admixed with 3.3 ml of acetic anhydride at ambient temperature under stirring conditions. The resulting mixture was admixed with 9.7 ml of triethylamine drop by drop and reacted for one hour. Thereafter, the reaction mixture was appropriately admixed with water, allowed to stand for a while, slanted to remove an aqueous phase, appropriately admixed with methanol, and dissolved under heating conditions. The resulting solution was filtrated, and the filtrate was admixed with 20 ml of a solution including 11.3 g of ammonium phosphate hexafluoride drop by drop under stirring conditions. The solution was reacted by heating at 70° C. in a thermo-bath for 30 min and cooled to ambient temperature. After the reaction, the formed crystal was collected by filtration and dried to obtain 10.5 g of a golden-green crystal of the cyanine dye represented by Chemical Formula 19.

A part of the crystal was measured in a conventional manner for a melting point, resulting in a melting point of 245–252° C.

EXAMPLE 2

Cyanine Dye

Twelve grams of a golden-green crystal of the cyanine dye represented by Chemical Formula 20 was obtained similarly as in Example 1 except for replacing 11.3 g of ammonium phosphate hexafluoride with 9.14 g of potassium antimonate hexafluoride.

A part of the crystal was measured in a conventional manner for a melting point, resulting in a melting point of 228–232° C.

EXAMPLE 3

Cyanine Dye

One hundred twenty milliliters of acetonitrile were placed in a reaction vessel, mixed with 12.2 g of the azo compound represented by Chemical Formula 77, and 4.0 g of cobaltous diacetate tetrahydrate, and further admixed with 11.7 ml of triethylamine drop by drop at 65° C. under stirring conditions and reacted for one hour under the same conditions. Thereafter, the reaction mixture was filtrated, and the filtrate was distilled to remove acetonitrile and to give ⅔ of the volume. The resulting solution was mixed with 100 ml of ethanol to disperse and left at ambient temperature for a time. The formed crystal was collected by filtration, washed with ethanol and water, and dried to obtain a greenish brown crystal of a triethylammonium salt of the azo organic metal complex anion represented by Chemical Formula 4. A part of the crystal was measured in a conventional manner, and the triethylammonium salt have an absorption maximum with a wavelength of 479 nm when dissolved in methanol, and have a melting point of 327.8° C.

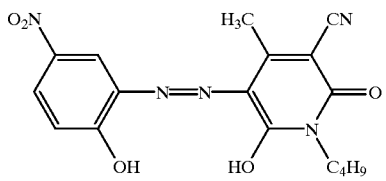

Chemical formula 77

Two hundred milliliters of acetonitrile were placed in a reaction vessel, mixed with 5.0 g of the cyanine dye represented by Chemical Formula 41, and 337 ml of an acetonitrile solution including 6.75 g of a triethylammonium salt of azo organic metal complex anion represented by Chemical Formula 4, and reacted by heating at 80° C. under stirring condition. After the reaction, the resulting solution was distilled to remove acetonitrile, and the residue was mixed with 400 ml of ethanol, heated at 60° C. for 30 min, and cooled to ambient temperature. The formed crystal was collected by filtration, washed with ethanol and water, and dried to obtain 9.4 g of a bright green crystal of the cyanine dye represented by Chemical Formula 43 with an azo organic metal complex anion as a counter ion.

EXAMPLE 4

Cyanine Dye

Forty milliliters of acetonitrile were placed in a reaction vessel, mixed with 7.08 g of the azo compound represented by Chemical Formula 78, and 2.57 g of cobaltous diacetate tetrahydrate, and further admixed with 7.5 ml of triethylamine drop by drop at 65° C. under stirring conditions and reacted for one hour under the same conditions. Thereafter, the reaction mixture was filtrated, and the filtrate was distilled to remove acetonitrile and to give ⅔ of the volume. The resulting solution was mixed with 80 ml of ethanol to disperse and left at ambient temperature for a while. The formed crystal was collected by filtration, washed with ethanol and water, and dried to obtain a greenish brown crystal of a triethylammonium salt of the azo organic metal complex anion represented by Chemical Formula 6. A part of the crystal was measured in a conventional manner, revealing that the triethylammonium salt had an absorption maximum with a wavelength of 465 nm when dissolved in methanol and had a melting point of 270.2° C.

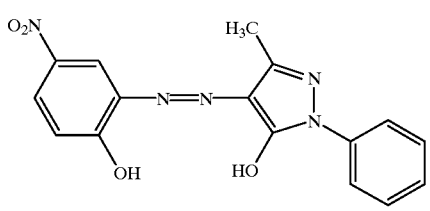

Chemical Formula 78

Two hundred milliliters of acetonitrile were placed in a reaction vessel, mixed with 6.2 g of the cyanine dye represented by Chemical Formula 15, and 1,000 ml of an acetonitrile solution containing 10 g of the triethylammonium salt of azo organic metal complex anion represented by Chemical Formula 6 as mentioned above, and reacted by heating at 80° C. under stirring conditions. After the reaction, the resulting solution was distilled to remove acetonitrile and to give ⅔ of the volume and left for a while to cool down. The formed crystal was collected by filtration, washed with ethanol, and dried to obtain 4.8 g of a bright green crystal of the cyanine dye represented by Chemical Formula 22 with an azo organic metal complex anion as a counter ion.

EXAMPLE 5

Cyanine Dye

Forty milliliters of acetonitrile were placed in a reaction vessel, mixed with 10 g of the azo compound represented by Chemical Formula 79, and 3.98 g of cobaltous diacetate tetrahydrate, and further admixed with 8.47 ml of triethylamine drop by drop at 65° C. under stirring conditions and reacted for one hour under the same conditions. Thereafter, the reaction mixture was treated similarly as in Example 3 to obtain a greenish brown crystal of the triethylammonium salt of azo organic metal complex anion represented by Chemical Formula 12. A part of the crystal was measured in a conventional manner, revealing that the triethylammonium salt had an absorption maximum with a wavelength of 537 nm when dissolved in methanol.

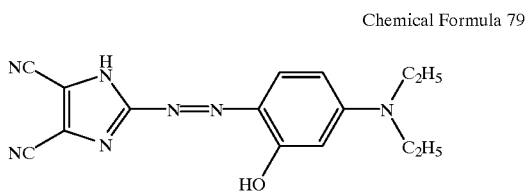

Chemical Formula 79

One hundred fifty milliliters of acetonitrile were placed in a reaction vessel, mixed with 2.3 g of the cyanine dye represented by Chemical Formula 33, and 500 ml of an acetonitrile solution containing 2.2 g of the triethylammonium salt of azo organic metal complex anion represented by Chemical Formula 12, and reacted by heating at 80° C. under stirring conditions. The reaction mixture was treated similarly as in Example 3 to obtain 9.4 g of a bright greenish brown crystal of the cyanine dye represented by Chemical Formula 35.

Although the production conditions and yields are varied in some degrees depending on the structures of the cyanine dyes of the present invention, all the cyanine dyes of the present invention, including the compounds represented by Chemical Formulae 13 to 72, can be produced by the methods in Examples 1 to 5 or in accordance therewith.

EXAMPLE 6

Light Absorption Characteristic of Cyanine Dye

Figure 2:
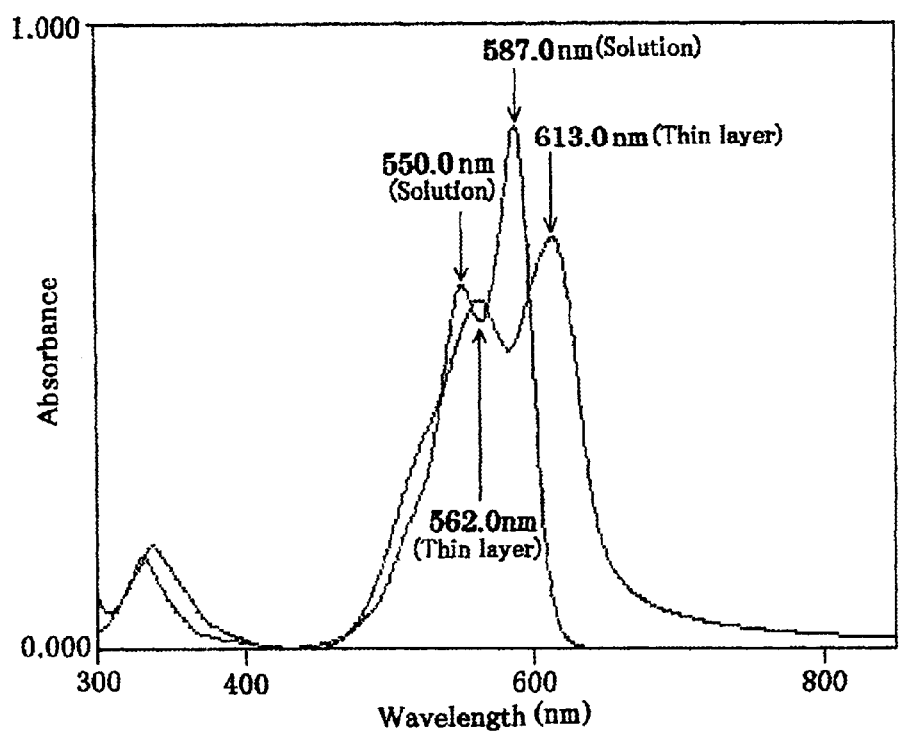
FIG. 2 is a visible absorption spectrum of a conventional related compound.

The cyanine dyes as listed in Table 1 of the present invention were measured for visible absorption spectra when dissolved in methanol and formed into layers over glasses. In parallel, conventional related compounds represented by Chemical Formulae 73 to 76 were measured for visible absorption spectra. The maximum absorption spectra in each conditions are tabulated in Table 1. FIGS. 1 and 2 show visible absorption spectra of the cyanine dye of the present invention represented by chemical Formula 20 and the conventional related compound represented by Chemical Formula 74 respectively, when dissolved in methanol.

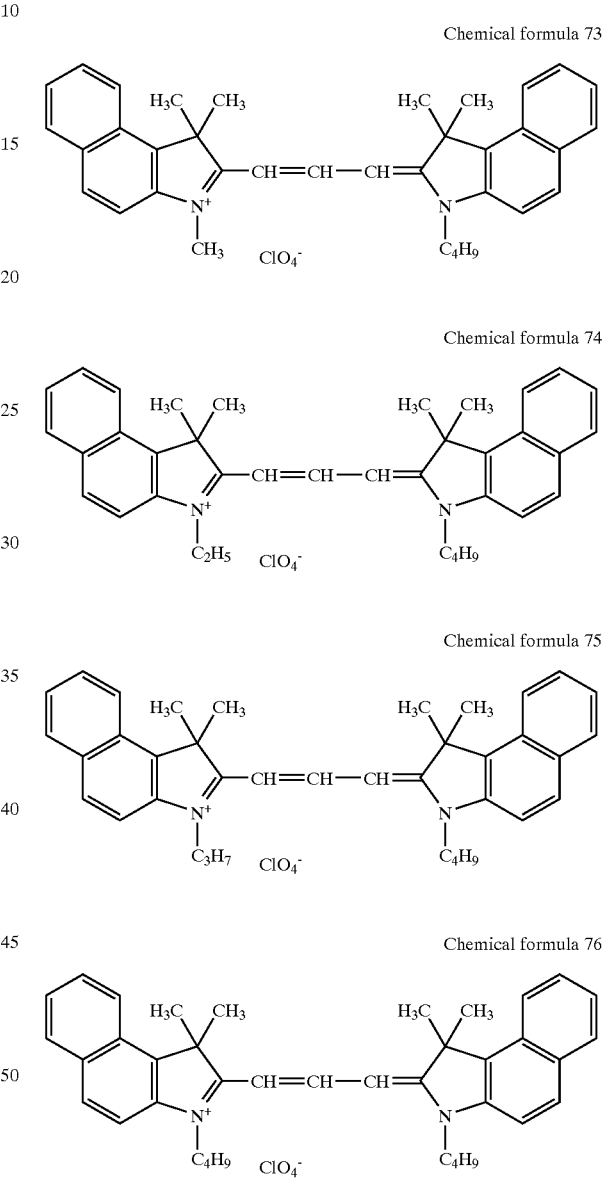

TABLE 1

| | Cyanine dye | | | Maximum absorption wavelength (nm) | | Solubility | Decomposition | |
|---|---|---|---|---|---|---|---|---|
| Compound | $R_1$ | $R_2$ | $X^-$ | Solution | Thin layer | (mg/ml) | point (° C.) | Remarks |
| Chemical Formula 16 | $CH_3$ | $CH_3$ | Chemical Formula 4 | 584 | 605 | 1.1 | 314.5 | Present invention |
| Chemical Formula 42 | $CH_3$ | $CH_3$ | Chemical Formula 1 | 590 | 612 | 0.26 | 317.7 | Present invention |
| Chemical Formula 43 | $CH_3$ | $CH_3$ | Chemical Formula 4 | 591 | 617 | 2.7 | 304.7 | Present invention |
| Chemical Formula 13 | $CH_3$ | $C_4H_9$ | $PF_6^-$ | 586 | 613 | 143 | 264.7 | Present invention |

TABLE 1-continued

| Compound | Cyanine dye | | | Maximum absorption wavelength (nm) | | Solubility | Decomposition | Remarks |
|---|---|---|---|---|---|---|---|---|
| | $R_1$ | $R_2$ | $X^-$ | Solution | Thin layer | (mg/ml) | point (° C.) | |
| Chemical Formula 14 | $CH_3$ | $C_4H_9$ | $SbF_6^-$ | 586 | 613 | 73 | 279.8 | Present invention |
| Chemical Formula 19 | $C_2H_5$ | $C_4H_9$ | $PF_6^-$ | 587 | 610 | 23 | 281.6 | Present invention |
| Chemical Formula 20 | $C_2H_5$ | $C_4H_9$ | $SbF_6^-$ | 587 | 612 | 140 | 281.8 | Present invention |
| Chemical Formula 21 | $C_2H_5$ | $C_3H_7$ | Chemical Formula 4 | 587 | 611 | 2.8 | 301.9 | Present invention |
| Chemical Formula 29 | $C_3H_7$ | $C_3H_7$ | $SbF_6^-$ | 588 | 613 | 36 | 293.3 | Present invention |
| Chemical Formula 30 | $C_3H_7$ | $C_4H_9$ | $PF_6^-$ | 588 | 613 | 15 | 289.4 | Present invention |
| Chemical Formula 31 | $C_3H_7$ | $C_4H_9$ | $SbF_6^-$ | 588 | 613 | 141 | 285.0 | Present invention |
| Chemical Formula 50 | $C_4H_9$ | $CH_3$ | $ClO_4^-$ | 593 | 626 | 64 | 261.3 | Present invention |
| Chemical Formula 56 | $C_4H_9$ | $CH_3$ | Chemical Formula 1 | 592 | 625 | 187 | 261.4 | Present invention |
| Chemical Formula 53 | $C_4H_9$ | $C_2H_5$ | $ClO_4^-$ | 594 | 627 | >200 | 244.5 | Present invention |
| Chemical Formula 33 | $C_4H_9$ | $C_4H_9$ | $SbF_6^-$ | 589 | 613 | 61 | 284.2 | Present invention |
| Chemical Formula 34 | $C_4H_9$ | $C_4H_9$ | Chemical Formula 4 | 587 | 613 | 1.1 | 310.6 | Present invention |
| Chemical Formula 35 | $C_4H_9$ | $C_4H_9$ | Chemical Formula 12 | 586 | 613 | 6.4 | 280.1 | Present invention |
| Chemical Formula 38 | $C_5H_{11}$ | $C_4H_9$ | $ClO_4^-$ | 587 | 613 | >190 | 262.7 | Present invention |
| Chemical Formula 39 | $C_5H_{11}$ | $C_4H_9$ | $SbF_6^-$ | 588 | 613 | 88 | 281.8 | Present invention |
| Chemical Formula 40 | $C_5H_{11}$ | $C_5H_{11}$ | $SbF_6^-$ | 588 | 613 | 94 | 257.3 | Present invention |
| Chemical Formula 73 | $CH_3$ | $C_4H_9$ | $ClO_4^-$ | 585 | 612 | 42 | 242.2 | Control |
| Chemical Formula 74 | $C_2H_5$ | $C_4H_9$ | $ClO_4^-$ | 587 | 612 | 22 | 211.5 | Control |
| Chemical Formula 75 | $C_3H_7$ | $C_4H_9$ | $ClO_4^-$ | 588 | 613 | 19 | 269.0 | Control |
| Chemical Formula 76 | $C_4H_9$ | $C_4H_9$ | $ClO_4^-$ | 588 | 613 | 17 | 266.1 | Control |

As shown in Table 1, all of the cyanine dyes of the present invention have absorption maxima at wavelengths around 580–600 nm when dissolved in methanol similarly as in the conventional related compounds represented by Chemical Formulae 73 to 76, and at wavelengths around 600–630 nm when formed in a thin layer. As shown in the visible absorption spectra of FIGS. 1 and 2, the absorption end of a longer wavelength region of the cyanine dye of the present invention represented by Chemical Formula 20 extended to a wavelength around 700 nm when formed in a thin layer similarly as in the conventional related compounds represented by Chemical Formula 74. These results showed that the cyanine dyes of the present invention are useful for high-density optical recording media such as DVD-Rs, because they substantially absorb a visible light with a wavelength of shorter than 700 nm, and more particularly, a laser beam with a wavelength around 630–680 nm.

EXAMPLE 7

Solubility of Cyanine Dye

For the cyanine dyes in Table 1, they were measured in a conventional manner for solubility in DDA at 20° C. In parallel, conventional related compounds represented by Chemical Formulae 73 to 76 were also measured for solubility in DAA in a similar way. The results are also shown in Table 1.

As found in the results in Table 1, most of the cyanine dyes of the present invention had higher solubilities than those of the conventional related compounds. The solubilities of conventional related compounds were under 50 mg/ml in DAA, while the solubilities of all the cyanine dyes of the present invention measured were almost equal to or higher than those of the conventional related compounds

EXAMPLE 8

Decomposition Point of Cyanine Dye

Figure 3:
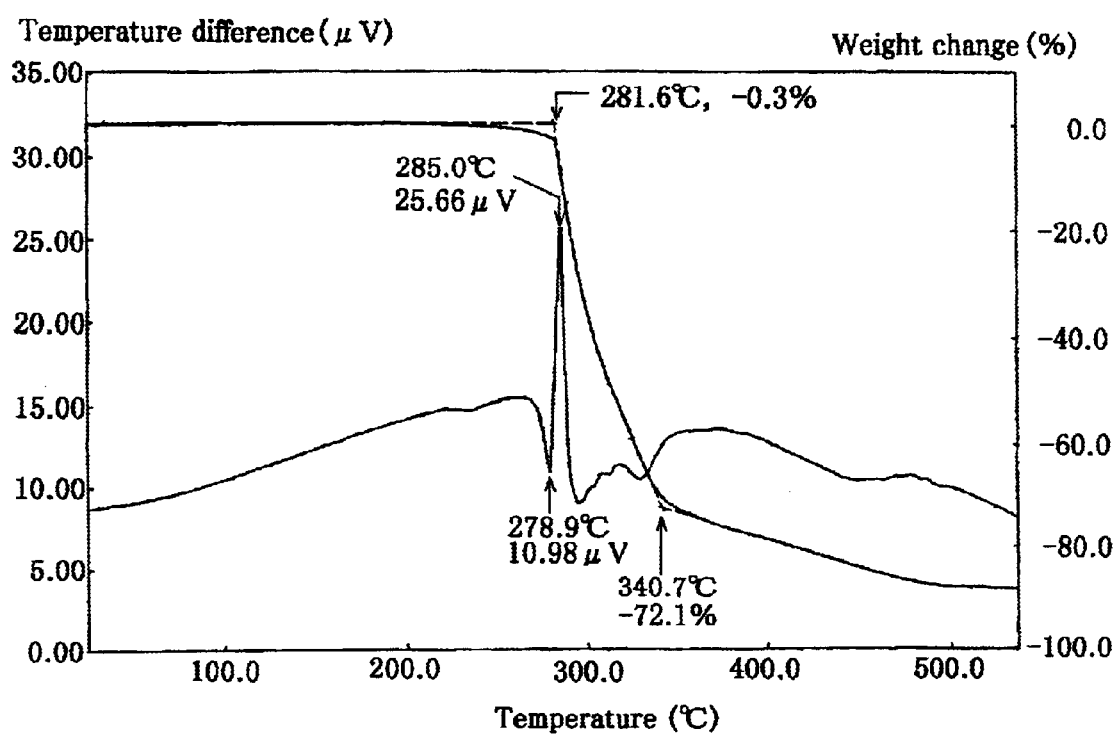
FIG. 3 shows the result on DTA and TGA for one of the cyanine dyes of the present invention.

An adequate amount of any one of the cyanine dyes in Table 1 as a test specimen was placed in a vessel and subjected to conventional differential thermal analysis (hereinafter abbreviated as "DTA") and thermogravimetric analysis (hereinafter abbreviated as "TGA") using "MODEL TG/DTA 220", a digital thermo analyzer commercialized by Seiko Instruments Inc., Tokyo, Japan, to determine their decomposition points, i.e., temperatures at which the cyanine dyes as test specimens begin to lose their weight on TGA. In parallel, conventional related compounds represented by Chemical Formulae 73 and 76 were analyzed similarly as above. The results are also shown in Table 1. FIG. 3 shows the results of DTA and TGA of the cyanine dye represented by Chemical Formula 19 of the present invention, respectively. In DTA and TGA, the environmental temperature was set to an increasing temperature mode at a rate of 10° C./min.

As shown in Table 1 and FIG. 3, all the conventional related compounds represented by Chemical Formulae 73 to 76 had decomposition points under 272° C., while most of the cyanine dyes of the present invention measured had remarkably higher decomposition points than those of the conventional related compounds, indicating that their heat resistance was relatively-high. Varying depending on glass transition temperature of substrate, when used as a light absorbent in optical recording media, dyes with a relatively-low heat resistance can be generally used to write information by using a lower-power laser beam as the merit, however, as the drawback, when exposed to a laser beam for a relatively-long period of time on reading, the dyes tend to accumulate heat and deform parts around pits and other pitless parts on recording surfaces, resulting in large jitters and reading errors. The fact that the cyanine dyes of the present invention have relatively-high decomposition points shows that high-density optical recording media having a relatively-small jitter, insubstantial reading error, and satisfactory stability of exposure to environmental light such as reading light and natural light can be obtained by using the cyanine dyes of the present invention as a light absorbent.

EXAMPLE 9

Optical Recording Medium

The cyanine dye represented by Chemical Formula 15, 19, 20, 31, or 41 was added to TFP to give a respective concentration of 2.0% (w/w), and the mixture was mixed with, as a light resistant improver, a formazane metal complex in which were bound two molecules of a formazane compound represented by Chemical Formula 80 in an amount of 0.2% (w/w), and heated for a time, followed by ultrasonically dissolving the contents. The resulting solution was in a conventional manner filtrated by a membrane, homogeneously coated in a rotatory manner over one side of a polycarbonate disc substrate, 12 cm in diameter and 0.6 mm in thickness, to which had been transferred concaves, 0.74 µm in trackpitch, 0.03µm in width and 76 nm in depth, for expressing synchronizing signals and addresses of tracks and sectors, to give a thickness of 100 nm by an injection molding. Thereafter, the substrate was spattered with silver to form a reflection layer, 100 nm in thickness, to be closely attached on the surface of the recording layer, and the reflection layer was homogeneously coated in a rotatory manner with "DAICURE CLEAR SD1700", as a known ultraviolet ray hardening resin commercialized by Dainippon Ink and Chemicals, Inc., Tokyo, Japan, and irradiated to form a protection layer to be closely attached on the surface of the reflection layer, followed by closely attaching and sticking a polycarbonate disc protection plate on the surface of the protection layer to obtain five types of optical recording media.

Chemical Formula 80

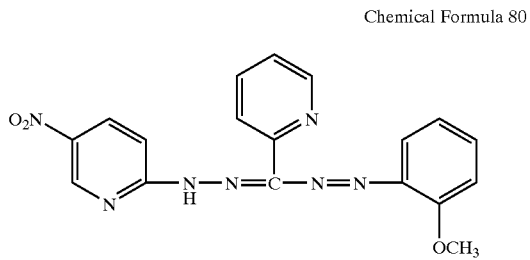

All of the optical recording media of this Example with good sensitivity, modulation characteristic, resolution, and electrical characteristics such as a jitter characteristic have a recording capacity of over 4 GB and can write large amounts of information of documents, images, voices, and digitals at a relatively-high density by a light pick-up using a visible light with a wavelength of shorter than 700 nm, and more particularly, a laser beam with an oscillation wavelength around 630–680 nm. Microscopic observation of the recorded surface of the optical recording media of this example, which had been written information by a semiconductor laser element with an oscillation wavelength of 658 nm, revealed that minute pits with a size of less than one µm/pit were formed at a track pitch of below one µm.

EXAMPLE 10

Optical Recording Medium

Five types of optical recording media were obtained similarly as in Example 9 except for replacing a formazane metal complex with a conventional diimmonium compound, "IRG022" by Nippon Kayaku Co., Ltd., Tokyo, Japan.

All of the optical recording media of this Example with good sensitivity, modulation characteristic, resolution, and electrical characteristics such as a jitter characteristic have a recording capacity of over 4 GB and can write large amounts of information of documents, images, voices, and digitals at a relatively-high density by a light pick-up using a visible light with a wavelength of shorter than 700 nm, and more particularly, a laser beam with an oscillation wavelength around 630–680 nm. Microscopic observation of the recorded surface of the optical recording media of this example, which had been written information by a semiconductor laser element with an oscillation wavelength of 658 nm, revealed that minute pits with a size of less than one µm/pit were formed at a track pitch of below one µm.

EXAMPLE 11

Optical Recording Medium

The cyanine dye represented by Chemical Formula 13, 29, or 50 as a light-resistant improver was added to DAA to give a respective concentration of 2.0% (w/w), and the mixture was heated for a time, followed by ultrasonically dissolving the contents. The resulting resulting solution was in a conventional manner filtrated by a membrane, homogeneously coated in a rotatory manner over one side of a polycarbonate disc substrate, 12 cm in diameter and 0.6 mm in thickness, to which had been transferred concaves, 0.74 µm in trackpitch, 0.03 µm in width and 76 nm in depth, for expressing synchronizing signals and addresses of tracks and sectors, to give a thickness of 100 nm by an injection molding. Thereafter, the substrate was spattered with silver to form a reflection layer, 100 nm in thickness, to be closely attached on the surface of the recording layer, and the reflection layer was homogeneously coated in a rotatory manner with "DAICURE CLEAR SD1700", as a known ultraviolet ray hardening resin commercialized by Dainippon Ink and Chemicals, Inc., Tokyo, Japan, and irradiated to form a protection layer to be closely attached on the surface of the reflection layer, followed by closely attaching and sticking a polycarbonate disc protection plate, 12 cm in diameter and 0.6 mm in thickness, on the surface of the protection layer to obtain three types of optical recording media.

All of the optical recording media of this Example with good sensitivity, modulation characteristic, resolution, and electrical characteristics such as a jitter characteristic have a recording capacity of over 4 GB and can write large amounts of information of documents, images, voices, and digitals at a relatively-high density by a light pick-up using a visible light with a wavelength of shorter than 700 nm, and more particularly a laser beam with an oscillation wavelength around 630–680 nm. Microscopic observation of the recorded surface of the optical recording medium of this example, which had been written information by a semiconductor laser element with an oscillation wavelength of 658 nm, revealed that minute pits with a size of less than one µm/pit were formed at a track pitch of below one µm.

EXAMPLE 12

Optical Recording Media

Two types of optical recording media were obtained similarly as in Example 9 except for a light absorbent with an equivalent mixture of the cyanine dyes represented by Chemical Formulae 15 and 16 by weight, or the cyanine dyes represented by Chemical Formulae 41 and 43.

All of the optical recording media of this Example with good sensitivity, modulation characteristic, resolution, and electrical characteristics such as a jitter characteristic have a recording capacity of over 4 GB and can write large amounts of information of documents, images, voices, and digitals at a relatively-high density by a light pick-up using a visible light with a wavelength of shorter than 700 nm, and more particularly a laser beam with an oscillation wavelength around 630–680 nm. Microscopic observation of the recorded surface of the optical recording media of this example, which had been written information by a semiconductor laser element with an oscillation wavelength of 658 nm, revealed that minute pits with a size of less than one μm/pit were formed at a track pitch of below one μm.

As described above, the present invention was made based on the creation of novel cyanine dyes and the findings of their industrially usable characteristics. The cyanine dyes substantially absorb a visible light with a wavelength of shorter than 700 nm, have relatively-high solubility in organic solvents such as DAA and a relatively-high heat resistance. Accordingly, the cyanine dyes of the present invention can be advantageously used as a light absorbent in optical recording media in the form of a DVD-R in which stable minute pits should be formed on a restricted recording surface at a relatively-high density by using, as a reading light, a visible light with a wavelength of shorter than 700 nm, and more particularly, a laser beam with a wavelength around 630–680 nm in writing information.

Comparing with CD-Rs now used in this field, the organic optical recording media of the present invention, which write information by using a visible light with a wavelength shorter than 700 nm, and more particularly, a laser beam with a wavelength around 630–680 nm, can form more minute pits at a narrower track pitch, and this results in advantageous characteristics of that they can record very large amounts of information of characters, images and/or voices at a relatively-high density. Thus, the cost per a bit required for recording information can be beneficially lowered by a large margin.

Since the cyanine dyes of the present invention remarkably improve the light resistance of other cyanine dyes without substantially absorbing visible light with wavelengths of longer than 700 nm, they can be advantageously used as a light-resistant improver, for example, in CD-Rs, and more particularly, high-speed writable CD-Rs now commercially available, which have recording layers composed of other cyanine dyes that substantially absorb visible light with wavelengths of longer than 700 nm and need laser beams with wavelengths around 775–795 nm as a writing light.

The useful cyanine dyes can be easily obtained in a desirable amount by the method of the present invention through a step of reacting a benzoindolenium compound having an active methyl group with a benzoindolenium compound having suitable leaving groups.

The present invention having such outstanding effects and functions is a significant invention that will greatly contribute to this art.

While what are at present considered to be the preferred embodiments of the invention have been described, it will be understood that various modifications may be made therein, and the appended claims are intended to cover all such modifications as fall within the true spirits and scope of the invention.

We claim:

1. In an optical recording medium comprising a recording layer on a substrate, the improvement wherein said recording layer comprises a trimethine cyanine dye represented by Formula 1 and having a decomposition point of over 272° C., in combination with a second trimethine cyanine dye represented by Formula 1 but having an anion other than an organic metal complex anion as a counter ion $X^-$;

Formula 1

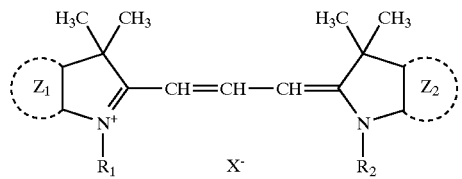

where in Formula 1, $R_1$ and $R_2$ independently represent an optionally substituted aliphatic hydrocarbon group; $Z_1$ and $Z_2$ independently represent an optionally substituted fused naphthalene ring to form a benzoindolenic ring; and $X^-$ represents an organic metal complex as a counter ion represented by Formula 6;

Formula 6

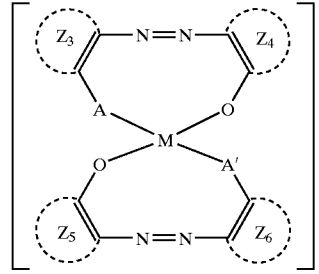

where in Formula 6, $Z_3$ and $Z_6$ each represent an identical or different aromatic ring or heterocyclic ring, which optionally has one or more substituents; $Z_4$ and $Z_5$ each represent an identical or different heterocyclic ring substituded by one or more cyano groups and optionally one or more other substituents;

M is a metal atom selected from the group consisting of metal elements of the 3 through 12 groups in the periodic table; and A and A' each represent an identical or different hetero atom, which is capable of forming a coordinate bond by providing an electron pair to M, and optionally forms an atomic group along with $Z_3$ and $Z_6$.

2. The optical recording medium of claim 1, which is capable of recording information thereon by writing thereon with a laser beam having a wavelength of around 630–680 nm.

* * * * *